US008392676B2

(12) United States Patent
Yata et al.

(10) Patent No.: US 8,392,676 B2
(45) Date of Patent: Mar. 5, 2013

(54) MANAGEMENT METHOD AND MANAGEMENT APPARATUS

(75) Inventors: Tomonori Yata, Yokohama (JP); Hideo Ohata, Fujisawa (JP); Hidetaka Sasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 12/836,186

(22) Filed: Jul. 14, 2010

(65) Prior Publication Data

US 2011/0246740 A1 Oct. 6, 2011

(30) Foreign Application Priority Data

Apr. 6, 2010 (JP) ................. 2010-088022

(51) Int. Cl.
*G06F 12/00* (2006.01)
(52) U.S. Cl. ........ 711/161; 711/100; 711/114; 711/162; 707/640; 707/641; 707/644; 707/645; 707/646; 707/647; 707/654
(58) Field of Classification Search .................. 711/100, 711/114, 161–162; 707/640, 641, 644–647, 707/654
See application file for complete search history.

(56) References Cited

U.S. PATENT DOCUMENTS

2007/0055713 A1  3/2007  Nagai et al.

FOREIGN PATENT DOCUMENTS

JP     2007-66259     3/2007

*Primary Examiner* — Tuan Thai
*Assistant Examiner* — Zhuo Li
(74) *Attorney, Agent, or Firm* — Brundidge & Stanger, P.C.

(57) ABSTRACT

A management method and management apparatus that can prevent deterioration of response performance of an entire system is suggested.
A management method and apparatus for managing a storage apparatus to which a hierarchical pool configuration technique is applied is designed to: select a migration-candidate virtual volume(s) from among virtual volumes to which a page(s) is allocated from a pool constituted from a storage tier(s) whose number of accesses per unit time has reached a performance threshold and whose used capacity has not reached a capacity threshold; select a pool(s) from which a page(s) is allocated to the virtual volume, as a migration source pool; also select a pool(s) constituted from a storage tier whose number of accesses per unit time has not reached the performance threshold, as a migration destination pool; decide a migration candidate pair(s) by combining the migration-candidate virtual volume(s) with the migration destination pool(s); calculate response performance of the entire system before and after migration respectively; and decide a migration candidate pair which is a migration object, based on the calculation result.

14 Claims, 27 Drawing Sheets

FIG.4

| 410 MIGRATION-CANDIDATE VIRTUAL VOLUME | 411 MIGRATION SOURCE POOL | 412 MIGRATION DESTINATION POOL | 413 AVERAGE RESPONSE PERFORMANCE VALUE OF ENTIRE SYSTEM (MS) | | 414 AVERAGE RESPONSE PERFORMANCE VALUE OF MIGRATION SOURCE POOL (MS) | | 415 AVERAGE RESPONSE PERFORMANCE VALUE OF MIGRATION DESTINATION POOL (MS) | | 416 MIGRATION-CANDIDATE VIRTUAL VOLUME USING AP | 417 MIGRATION DESTINATION POOL USING AP | 418 MIGRATION EXECUTION CANDIDATE SELECTION |
|---|---|---|---|---|---|---|---|---|---|---|---|
| | | | BEFORE MIGRATION | AFTER MIGRATION | BEFORE MIGRATION | AFTER MIGRATION | BEFORE MIGRATION | AFTER MIGRATION | | | |
| VVOL A | POOL A | POOL B | 3.1 | 2.2 | 4.1 | 1.4 | 1.8 | 2.7 | AP A, AP B | AP D, AP E, AP F | ☑ |
| VVOL B | POOL A | POOL B | 3.1 | 2.9 | 4.1 | 0.8 | 1.8 | 3.3 | AP C | AP D, AP E, AP F | ☐ |

403 EXECUTE MIGRATION

FIG.5

| PAGE IDENTIFIER | AVERAGE I/O QUANTITY | PAGE IDENTIFIER | AVERAGE I/O QUANTITY |
|---|---|---|---|
| PG A1 | 200 | PG B16 | 50 |
| PG A2 | 200 | PG B17 | 50 |
| PG A3 | 200 | PG B18 | 50 |
| PG A4 | 200 | PG C1 | 50 |
| PG A5 | 100 | PG C2 | 50 |
| PG A6 | 100 | PG C3 | 50 |
| PG A7 | 100 | PG C4 | 50 |
| PG A8 | 100 | PG C5 | 25 |
| PG B1 | 400 | PG C6 | 25 |
| PG B2 | 400 | PG C7 | 25 |
| PG B3 | 50 | PG C8 | 25 |
| PG B4 | 50 | PG D1 | 50 |
| PG B5 | 50 | PG D2 | 50 |
| PG B6 | 50 | PG D3 | 50 |
| PG B7 | 50 | PG D4 | 50 |
| PG B8 | 50 | PG D5 | 50 |
| PG B9 | 50 | PG D6 | 50 |
| PG B10 | 50 | PG D7 | 25 |
| PG B11 | 50 | PG D8 | 25 |
| PG B12 | 50 | PG D9 | 25 |
| PG B13 | 50 | PG D10 | 25 |
| PG B14 | 50 | PG D11 | 25 |
| PG B15 | 50 | PG D12 | 25 |

FIG.6

| POOL IDENTIFIER | STORAGE TIER IDENTIFIER | STORAGE TIER TYPE | CAPACITY THRESHOLD | ACTUAL CAPACITY USAGE RATE | PERFORMANCE THRESHOLD |
|---|---|---|---|---|---|
| POOL A | TIER A | SSD | 90 | 34 | 1600 |
| POOL A | TIER B | SAS | 90 | 50 | 2000 |
| POOL B | TIER C | SSD | 90 | 90 | 1600 |
| POOL B | TIER D | SAS | 90 | 11 | 2000 |

FIG.7

| VIRTUAL VOLUME IDENTIFIER | PAGE IDENTIFIER | POOL IDENTIFIER | STORAGE TIER IDENTIFIER |
|---|---|---|---|
| VVOL A | PG A1 | POOL A | TIER A |
| VVOL A | PG A2 | POOL A | TIER A |
| ... | ... | ... | ... |
| VVOL A | PG A7 | POOL A | TIER B |
| VVOL A | PG A8 | POOL A | TIER B |
| VVOL B | PG B1 | POOL A | TIER A |
| VVOL B | PG B2 | POOL A | TIER A |
| ... | ... | ... | ... |
| VVOL B | PG B13 | POOL A | TIER B |
| VVOL B | PG B14 | POOL A | TIER B |
| VVOL C | PG C1 | POOL B | TIER C |
| VVOL C | PG C2 | POOL B | TIER C |
| ... | ... | ... | ... |
| VVOL C | PG C7 | POOL B | TIER C |
| VVOL C | PG C8 | POOL B | TIER C |
| VVOL D | PG D1 | POOL B | TIER C |
| VVOL D | PG D2 | POOL B | TIER C |
| ... | ... | ... | ... |
| VVOL D | PG D11 | POOL B | TIER D |
| VVOL D | PG D12 | POOL B | TIER D |
| 702 | 703 | 704 | 705 |

| APPLICATION IDENTIFIER | FILE SYSTEM IDENTIFIER |
|---|---|
| AP A | FS A |
| AP B | FS B |
| AP D | FS C |
| AP E | FS D |
| AP F | FS E |

| FILE SYSTEM IDENTIFIER | DEVICE FILE IDENTIFIER |
|---|---|
| FS A | DF A |
| FS B | DF A |
| FS C | DF C |
| FS D | DF C |
| FS E | DF D |

| APPLICATION IDENTIFIER | DEVICE FILE IDENTIFIER |
|---|---|
| AP C | DF B |
|  |  |
|  |  |

| DEVICE FILE IDENTIFIER | VIRTUAL VOLUME IDENTIFIER |
|---|---|
| DF A | VVOL A |
| DF B | VVOL B |
| DF C | VVOL C |
| DF D | VVOL D |

| STORAGE TIER TYPE COLUMN | RESPONSE PERFORMANCE |
|---|---|
| SSD | 1 |
| SAS | 5 |
| SATA | 10 |

| POOL IDENTIFIER | STORAGE TIER IDENTIFIER |
|---|---|
| POOL A | TIER A |
|  |  |
|  |  |

| APPLICATION IDENTIFIER | MIGRATION POSSIBILITY |
|---|---|
| AP A | POSSIBLE |
| AP B | POSSIBLE |
| AP C | POSSIBLE |
| AP D | POSSIBLE |
| AP E | IMPOSSIBLE |
| AP F | IMPOSSIBLE |

| VIRTUAL VOLUME IDENTIFIER | POOL IDENTIFIER |
|---|---|
| VVOL A | POOL A |
| VVOL B | POOL A |

| POOL IDENTIFIER |
|---|
| POOL B |
|  |
|  |

| MIGRATION CANDIDATE PAIR IDENTIFIER | MIGRATION-CANDIDATE VIRTUAL VOLUME IDENTIFIER | MIGRATION SOURCE POOL IDENTIFIER | MIGRATION DESTINATION POOL IDENTIFIER |
|---|---|---|---|
| M1 | VVOL A | POOL A | POOL B |
| M2 | VVOL B | POOL A | POOL B |
| 313A | 313B | 313C | 313D |

| MIGRATION CANDIDATE PAIR IDENTIFIER | POOL IDENTIFIER | STORAGE TIER IDENTIFIER | NUMBER OF PAGES PLACED AFTER PLACEMENT CHANGE |
|---|---|---|---|
| M1 | POOL A | TIER A | 16 |
| M1 | POOL A | TIER B | 2 |
| M1 | POOL B | TIER C | 16 |
| M1 | POOL B | TIER D | 12 |
| M2 | POOL A | TIER A | 8 |
| M2 | POOL A | TIER B | 0 |
| M2 | POOL B | TIER C | 16 |
| M2 | POOL B | TIER D | 22 |
| 318A | 318B | 318C | 318D |

| MIGRATION CANDIDATE PAIR IDENTIFIER | PRE-MIGRATION SYSTEM RESPONSE PERFORMANCE | POST-MIGRATION SYSTEM RESPONSE PERFORMANCE | PRE-MIGRATION MIGRATION SOURCE POOL RESPONSE PERFORMANCE | POST-MIGRATION MIGRATION SOURCE POOL RESPONSE PERFORMANCE | PRE-MIGRATION MIGRATION DESTINATION POOL RESPONSE PERFORMANCE | POST-MIGRATION MIGRATION DESTINATION POOL RESPONSE PERFORMANCE |
|---|---|---|---|---|---|---|
| M1 | 3.1 | 2.2 | 4.1 | 1.4 | 1.8 | 2.7 |
| M2 | 3.1 | 2.9 | 4.1 | 0.8 | 1.8 | 3.3 |
| 320A | 320B | 320C | 320D | 320E | 320F | 320G |

| APPLICATION IDENTIFIER | VIRTUAL VOLUME IDENTIFIER |
|---|---|
| AP A | VVOL A |
| AP B | VVOL A |
| AP C | VVOL B |
| AP D | VVOL C |
| AP E | VVOL C |
| AP F | VVOL D |

317A    317B    317

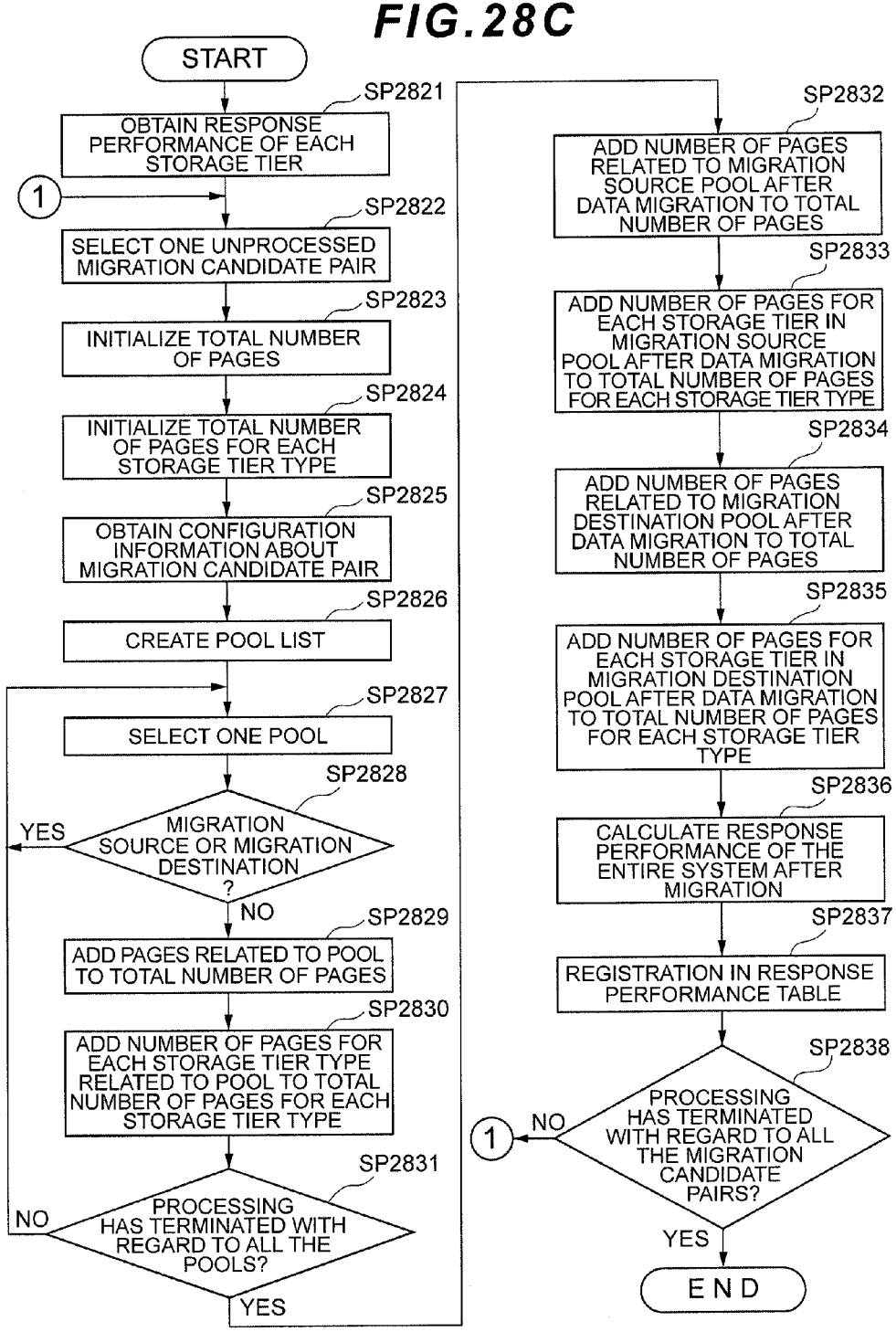

MANAGEMENT METHOD AND MANAGEMENT APPARATUS

CROSS-REFERENCES TO RELATED APPLICATIONS

This application relates to and claims priority from Japanese Patent Application No. 2010-88022, filed on Apr. 6, 2010, the entire disclosure of which is incorporated herein by reference.

BACKGROUND

1. Field of the Invention

The invention relates to a management method and management apparatus and is suited for use in, for example, a management apparatus for managing the performance of a storage apparatus in a computer system.

2. Description of Related Art

A hierarchical pool configuration technique for creating a pool by using multiple types of storage devices with different levels of performance has been suggested as a storage virtualization technique (see, for example, Japanese Patent Laid-Open (Kokai) Application Publication No. 2007-066259). The hierarchical pool configuration technique partitions storage areas of virtual volumes into specified size called "pages" and switches, on a page basis according to the I/O quantity per unit time, storage devices to which pages are regularly placed, for example, to high-performance storage devices for pages with high I/O load or to low-performance storage devices for pages with low I/O load.

As compared to a case where storage areas are allocated from a single type of storage devices to virtual volumes, the above-described hierarchical pool configuration technique determines storage devices to be allocated for each minute piece of data called "page." Therefore, when designing the configuration that satisfies performance requirements and capacity requirements for a system, the capacity of required high-performance storage devices will be reduced and storage costs can be reduced.

Regarding the hierarchical pool configuration technique, storage devices constituting a pool have performance threshold and capacity threshold values. The performance threshold is a value indicating that "if the I/O quantity per unit time exceeds this value, response performance can no longer be guaranteed." If the sum of I/O quantities per unit time of storage areas allocated by storage devices to virtual volumes exceeds the performance threshold, placement of the storage areas from the relevant storage devices is stopped and the storage areas are placed from storage devices whose level of performance is one level lower than the above-mentioned storage devices. The capacity threshold is a value indicating that if an actual capacity usage rate has reached this value, placement of storage areas from the relevant storage devices to virtual volumes is stopped.

Consequently, it is possible to secure a certain or higher level of response performance of each storage device by setting the performance threshold to the storage devices in the hierarchical pool configuration as described above. It is also possible to not allocate storage areas, which exceed the capacity of the storage devices, to the virtual volumes by setting the capacity threshold to the storage devices.

In a case where the performance of storage devices exceeds the performance threshold in the hierarchical pool configuration, it can be estimated that the relevant storage devices allocate storage areas to one or more pages with a large I/O quantity in virtual volumes, and high load is imposed on the storage devices.

In such a case, pages of the high-performance storage devices cannot be fully utilized, thereby causing a problem of worsening average response performance of the entire system.

SUMMARY

The present invention was devised in light of the circumstances described above and it is an object of the invention to suggest a management method and management apparatus capable of preventing degradation of response performance of the entire system.

In order to solve the problems described above, a management method for managing a storage apparatus according to an aspect of this invention is characterized in that the storage apparatus manages, as different types of storage tiers, each of storage areas provided by multiple types of storage devices with different levels of performance, constitutes a pool from the different types of storage tiers, provides a virtual volume to a host system, dynamically allocates a storage area of specified size on a page basis from the pool to the virtual volume in response to a write request from the host system to the virtual volume, and regularly or irregularly switches a storage tier, from which a page is allocated, to another type of storage tier, depending on the number of accesses per unit time to the page allocated to the virtual volume, and wherein the management method includes: a first step of detecting, as a high-load storage tier, a storage tier whose number of accesses per unit time has reached a performance threshold and whose used capacity has not reached a capacity threshold; a second step of detecting a virtual volume to which a page is allocated from a pool constituted from the high-load storage tier, selecting virtual volumes that are migration candidates whose data is to be migrated, from among the detected virtual volume, and selecting, as a migration source pool, a pool from which a page is allocated to the virtual volume; a third step of selecting, as a migration destination pool, a pool whose at least one constituting storage tier has the number of accesses per unit time not reaching the performance threshold, and which is different from the migration source pool; a fourth step of deciding a migration candidate pair by combining the selected migration-candidate virtual volumes and the selected migration destination pool; a fifth step of calculating, for each migration candidate pairs, response performance of an entire system before and after migration when data written to the migration-candidate virtual volume is to be migrated to the migration destination pool; a sixth step of deciding a migration candidate pair which is a migration object, based on the response performance of the entire system before and after the migration; and a seventh step of controlling the storage apparatus so that data of the migration-candidate virtual volumes constituting the decided migration candidate pair will be migrated to the migration destination pool constituting the migration candidate pair.

In order to solve the problems mentioned earlier, a management apparatus for managing a storage apparatus according to another aspect of the invention is characterized in that the storage apparatus manages, as different types of storage tiers, each of storage areas provided by multiple types of storage devices with different levels of performance, constitutes a pool from the different types of storage tiers, provides a virtual volume to a host system, dynamically allocates a storage area of specified size on a page basis from the pool to the virtual volume in response to a write request from the host system to the virtual volume, and regularly or irregularly switches a storage tier, from which a page is allocated, to another type of storage tier, depending on the number of accesses per unit time to the page allocated to the virtual volume, and wherein the management apparatus includes: a high-load storage tier detector for detecting, as a high-load storage tier, a storage tier whose number of accesses per unit time has reached a performance threshold and whose used capacity has not reached a capacity threshold; a migration source candidate selector for detecting a virtual volume to which a page is allocated from a pool constituted from the high-load storage tier, selecting virtual volumes that are migration candidates whose data is to be migrated, from among the detected virtual volume, and selecting, as a migration source pool, a pool from which a page is allocated to the virtual volume; a migration destination candidate selector for selecting, as a migration destination pool, a pool whose at least one constituting storage tier has the number of accesses per unit time not reaching the performance threshold, and which is different from the migration source pool; a migration candidate pair decision unit for deciding a migration candidate pair by combining the selected migration-candidate virtual volume and the selected migration destination pool; a response performance calculator for calculating, for each migration candidate pair, response performance of the entire system before and after migration when data written to the migration-candidate virtual volume is to be migrated to the migration destination pool; a migration object decision unit for deciding a migration candidate pair which is a migration object, based on the response performance of the entire system before and after the migration; and a migration control unit for controlling the storage apparatus so that data of the migration-candidate virtual volume constituting the decided migration candidate pair will be migrated to the migration destination pool constituting the migration candidate pair.

According to this invention, it is possible to maximize an improvement rate of response performance before and after migration of data written to the migration-candidate virtual volume based on the number of accesses per unit time for each page allocated to the virtual volume(s). Accordingly, cases where storage areas in high-performance storage devices are not fully used due to a large number of accesses per unit time can be detected and such situation can be solved. Therefore, it is possible to enhance the response performance of the entire system.

BRIEF DESCRIPTION OF THE DRAWINGS

FIG. 4 is a schematic diagram showing a screen configuration example for a migration information display screen.

FIG. 5 is a conceptual diagram showing the configuration of a page performance information table.

FIG. 6 is a conceptual diagram showing the configuration of a storage tier configuration information table.

FIG. 7 is a conceptual diagram showing the configuration of a virtual volume/page/pool/storage tier correspondence table.

FIG. 8 is a conceptual diagram showing the configuration of an AP/file system correspondence table.

FIG. 9 is a conceptual diagram showing the configuration of a file system/device file correspondence table.

FIG. 10 is a conceptual diagram showing the configuration of an AP/device file correspondence table.

FIG. 11 is a conceptual diagram showing the configuration of a device file/virtual volume correspondence table.

FIG. 12 is a conceptual diagram showing the configuration of a storage tier response performance table.

FIG. 13 is a conceptual diagram showing the configuration of a high-load storage tier table.

FIG. 14 is a conceptual diagram showing the configuration of an AP condition table.

FIG. 15 is a conceptual diagram showing the configuration of a migration source candidate information table.

FIG. 16 is a conceptual diagram showing the configuration of a migration destination candidate information table.

FIG. 17 is a conceptual diagram showing the configuration of a migration candidate pair table.

FIG. 18 is a conceptual diagram showing the configuration of a post-page placement information table.

FIG. 19 is a conceptual diagram showing the configuration of a response performance table.

FIG. 20 is a conceptual diagram showing the configuration of an AP/virtual volume correspondence table.

FIG. 28C is a flowchart illustrating a processing sequence of post-migration system response time calculation processing.

DETAILED DESCRIPTION OF PREFERRED EMBODIMENTS

An embodiment of the present invention will be explained below with reference to the attached drawings.

(1) Configuration of Computer System According to this Embodiment

Figure 1:
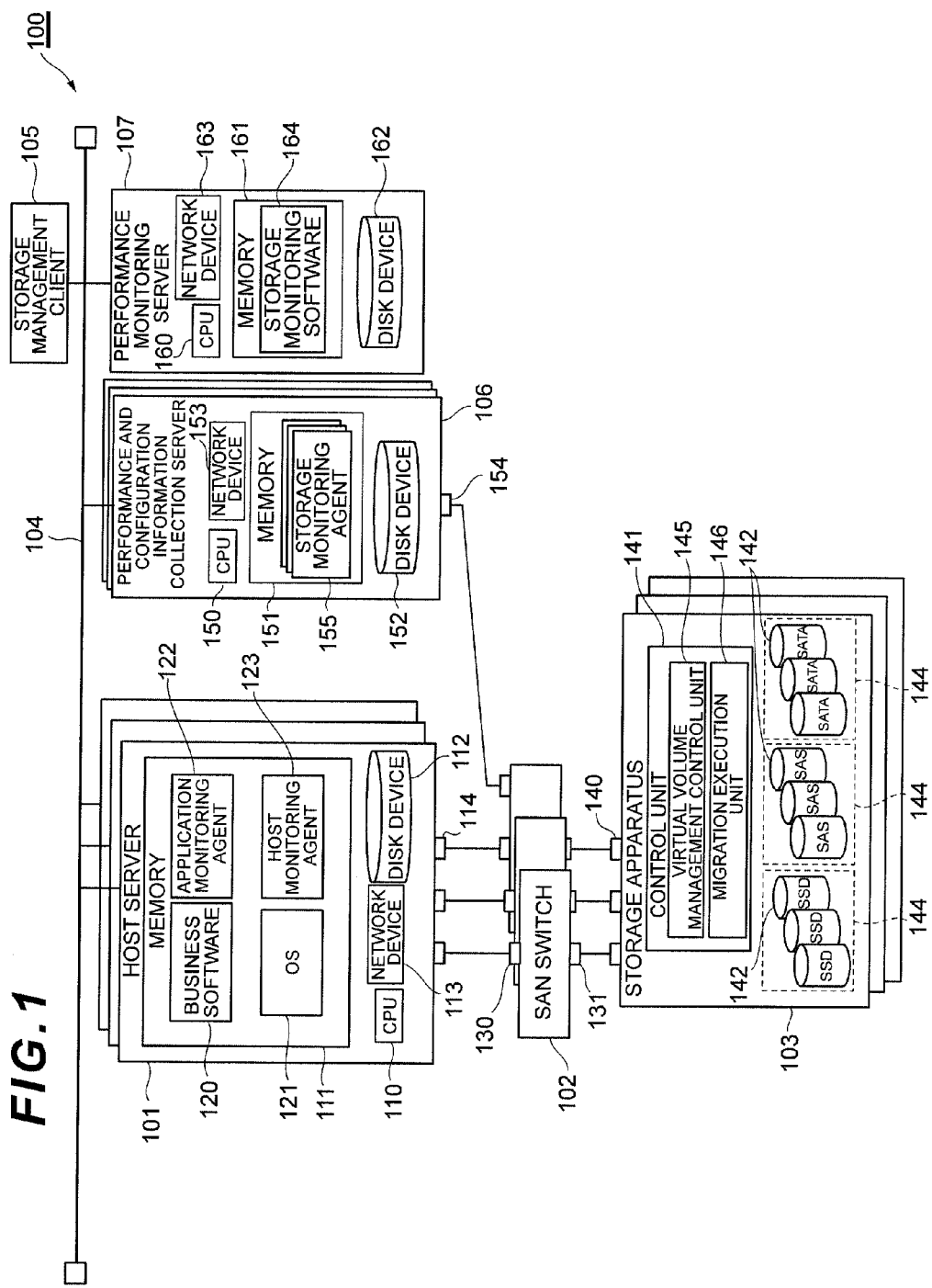
FIG. 1 is a block diagram of the overall configuration of a computer system according to an embodiment of this invention.

Referring to FIG. 1, reference numeral "100" represents a computer system according to this embodiment as a whole.

This computer system 100 includes a business system for executing processing relating to business in a SAN (Storage Area Network) environment, and a storage management system for managing storage apparatuses in the SAN environment.

The business system includes, as hardware, one or more host servers 101, one or more SAN switches 102, one or more storage apparatuses 103, and a LAN (Local Area Network) 104; and also includes, as software, one or more pieces of business software 120 mounted in the host server(s) 101. The business software 120 includes database management software and mail software.

The host server 101 includes a CPU (Central Processing Unit) 110, a memory 111, a hard disk device(s) 112, and a network device 113.

The CPU 110 is a processor that reads various software programs stored in the hard disk device 112 to the memory 111 and then executes them. In the following explanation, processing executed by the software programs read to the memory 111 is actually executed by the CPU 110 which executes those software programs.

The memory 111 is composed of, for example, a semiconductor memory such as a DRAM (Dynamic Random Access Memory). The memory 111 stores various pieces of software to be executed by the CPU 110 and various pieces of information to which the CPU 100 refers. Specifically speaking, the memory 111 stores software programs such as the business software 120, an OS (Operating System) 121, an application monitoring agent 122, and a host monitoring agent 123.

The hard disk device 112 is used to store, for example, various pieces of software and various pieces of information. Incidentally, a semiconductor memory such as a flash memory or an optical disk device may be used instead of the hard disk device 112.

The network device 113 is used by the host server 101 to communicate with a performance monitoring server 107 described later via the LAN 104 and communicate with the storage apparatus 103 via the SAN switch 102. The network device 113 has ports 114 serving as connection terminals for communication cables. In this embodiment, data is input or output from the host server 101 to the storage apparatus 103 according to Fibre Channel (FC) protocol, but the data input/output may be performed according to other protocols. Also, the LAN 104 may be used instead of the network device 113 and the SAN switch 102 for communication between the host server 101 and the storage apparatus 103.

Each SAN switch 102 has one or more host-side ports 130 and storage-side ports 131. A data access path between the host server 101 and the storage apparatus 103 is set by switching connection between the host-side port(s) 130 and the storage-side port(s) 131.

Each storage apparatus 103 has a virtualization function that provides virtual logical volumes (hereinafter referred to as the "virtual volume(s)") to the host server 101 and dynamically allocates storage areas to the virtual volumes in response to a data write request from the host server. The storage apparatus 103 includes one or more ports 140, a control unit 141, and a plurality of storage devices 142.

The port(s) 140 is used to communicate with the host server 101 or a performance and configuration information collection server 106 described later via the SAN switch 102.

The storage devices 142 are constituted from expensive disks such as SSD (Solid State Drive) or SAS (Serial Attached SCSI) disks, and inexpensive disks such as SATA (Serial AT Attachment) disks. Incidentally, in addition to or instead of the SSD or SAS disks, and SATA disks, for example, SCSI (Small Computer System Interface) disks or optical disk devices may be used as the storage devices 142.

Figure 2:
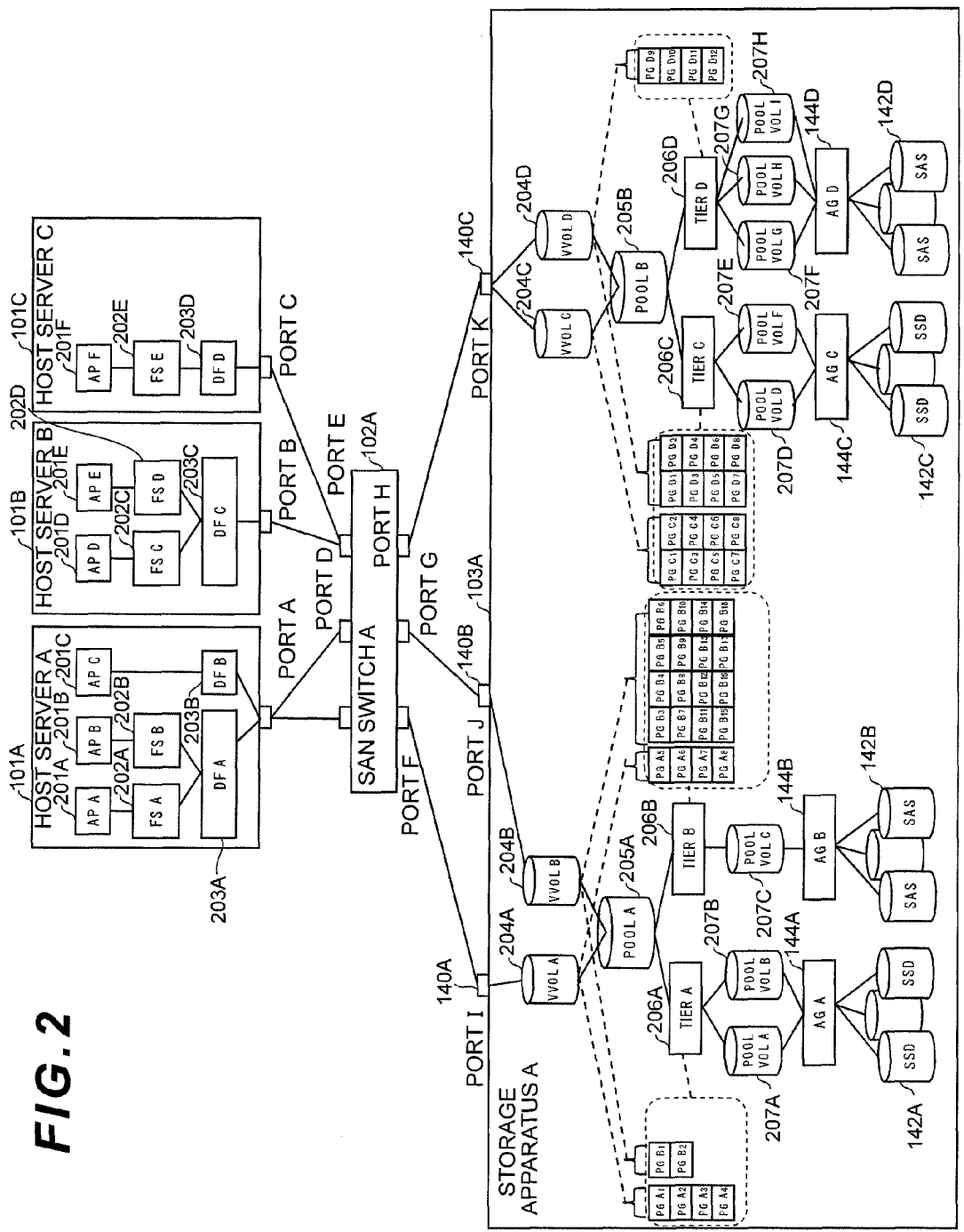
FIG. 2 is a block diagram explaining the resource configuration and the relationship between resources.

One or more array groups 144 is formed from the same type of one or more storage devices 142 (such as SSD or SAS disks, or SATA disks), and a storage area which is provided by one array group 144 is dynamically allocated on a basis of a unit of specified size called "page(s)" to the virtual volume(s). The relationship between the array groups 144, pages, and virtual volumes will be explained later (FIG. 2).

The control unit 141 includes hardware resources such as a processor and a memory and controls the operation of the storage apparatus 103. For example, the control unit 141 controls reading data from, and writing data to, the storage devices 142 in response to a read request or a write request sent from the host server 101.

The control unit 141 also includes at least a virtual volume management control unit 145 and a migration execution unit 146. The virtual volume management control unit 145 provides the storage areas, which are provided by the storage devices 142, as virtual volumes to the host server 101. The migration execution unit 146 controls the relevant storage devices 142 according to a migration command issued by the performance monitoring server 107, thereby migrating data between the array groups 144 or to/from another storage apparatus 103. It should be noted that the virtual volume management control unit 145 and the migration execution unit 146 may be implemented by the processor (not shown in the drawing) in the control unit 141 executing the software programs stored in the memory (not shown in the drawing) in the control unit 141.

The business software 120 is application software for providing a logical business function of the business system. The business software 120 executes input/output of data to/from the storage apparatus 103 as the need arises.

Data in the storage apparatus 103 is accessed from the business software 120 via the OS 121, the network device 113, the ports 114, the SAN switch 102, and the ports 140 on the storage apparatus 103.

The OS 121 is basic software of the host server 101 and provides storage areas, to or from which the business software 120 inputs or outputs data, in files. Files managed by the OS 121 are associated in a certain file group unit (hereinafter referred to as the "file system") with the virtual volumes managed by the OS 121 by means of, for example, mount operation. Files in the file system are managed by a tree structure in many cases.

On the other hand, the storage management system includes, as hardware, a storage management client 105, one or more performance and configuration information collection servers 106, and a performance monitoring server 107; and also includes, as software, storage management software 164 mounted in the performance monitoring server 107, an application monitoring agent 122 and a host monitoring agent 123 mounted in the host server 101, and a storage monitoring agent 155 mounted in the performance and configuration information collection server 106.

The storage management client 105 is a device for providing a user interface function of the storage management software 164. The storage management client 105 includes at least an input device for accepting input from a user and a display device for displaying information for the user (not shown in the drawing). The display device is composed of, for example, a CRT (Cathode Ray Tube) or a liquid crystal display device. A configuration example for a GUI (Graphical User Interface) screen will be explained later (FIG. 4). The storage management client 105 communicates with the storage management software 164 for the performance monitoring server 107 via the LAN 104.

The performance and configuration information collection server 106 includes a CPU 150, a memory 151, a hard disk device(s) 152, and a network device 153.

The CPU 150 is a processor that reads various software programs stored in the hard disk device 152 to the memory 151 and then executes them. In the following explanation, processing executed by the software programs read to the memory 151 is actually executed by the CPU 150 which executes those software programs.

The memory 151 is composed of, for example, a semiconductor memory such as a DRAM (Dynamic Random Access Memory). The memory 151 stores software read from the hard disk device 152 and executed by the CPU 150 and data to which the CPU 150 refers. Specifically speaking, the memory 151 stores at least a storage monitoring agent 155.

The hard disk device 152 is used to store, for example, various pieces of software and data. Incidentally, a semiconductor memory such as a flash memory or an optical disk device may be used instead of the hard disk device 152.

The network device 153 is used by the performance and configuration information collection server 106 to communicate with the performance monitoring server 107 via the LAN 104 and communicate, via the LAN 104, with the storage apparatus 103 which is a monitored object of the storage monitoring agent 155. The network device 153 has a port 154 serving as a connection terminal for a communication cable.

The performance monitoring server 107 includes a CPU 160, a memory 161, a hard disk device(s) 162, and a network device 163.

The CPU 160 is a processor that reads software programs stored in the hard disk device 162 to the memory 161 and then executes them. In the following explanation, processing executed by the software programs read to the memory 161 is actually executed by the CPU 160 which executes those software programs.

The memory 161 is composed of, for example, a semiconductor memory such as a DRAM (Dynamic Random Access Memory). The memory 161 includes software read from the hard disk device 162 and executed by the CPU 160 and information to which the CPU 160 refers. Specifically speaking, the memory 161 stores at least storage management software 164.

The hard disk device 162 is used to store, for example, various pieces of software and information. Incidentally, a semiconductor memory such as a flash memory or an optical disk device may be used instead of the hard disk device 162.

The network device 163 is used by the performance monitoring server 107 to communicate, via the LAN 104, with the storage management client 105, the performance and configuration information collection server 106, the host server 101, and so on.

The storage management software 164 is software for providing a function that collects and monitors configuration information, performance information, and application information in the SAN environment, and migrates data to other storage devices 142 if the storage devices 142 in the relevant storage apparatus 103 are overloaded. The storage management software 164 uses the application monitoring agent 122, the host monitoring agent 123, and the storage monitoring agent 155 in order to obtain the configuration information, the performance information, and the application information from hardware and software constituting the SAN environment.

The application monitoring agent 122 is software for collecting various pieces of performance information and configuration information about the business software 120. The host monitoring agent 123 is software for collecting performance information and configuration information required for the host server 101.

The storage monitoring agent 155 is software for collecting necessary performance information and configuration information from the storage apparatus 103 via the port 154 on the network device 153 and the SAN switch 102. FIG. 1 shows the configuration in which the storage monitoring agent 155 is mounted on the dedicated performance and configuration information collection server 106; however, the storage monitoring agent 155 may operate on the performance monitoring server 107.

(2) Resource Configuration and Relationship Between Resources

FIG. 2 shows a specific example of the resource configuration and the relationship between resources in the SAN environment according to this embodiment.

Hardware in the SAN environment shown in FIG. 2 is constituted from three host servers 101A to 101C named "host server A" to "host server C," one SAN switch 102A named "SAN switch A," and one storage apparatus 103A named "storage apparatus A." FIG. 2 illustrates the case where there is one storage apparatus; however, a plurality of storage apparatuses may exist.

Each of the "host server A" to "host server C" corresponds to the host server 101 in FIG. 1. The "SAN switch A" corresponds to the SAN switch 102 in FIG. 1. The "storage apparatus A" corresponds to the storage apparatus 103 in FIG. 1.

Applications 201A to 201C named "AP A" to "AP C" operate on the host server 101A named the "host server A"; applications 201D, 201E named "AP D" and "AP E" operate on the host server 101B named the "host server B"; and an application 201F named "AP F" operates on the host server 101C named the "host server C." Each of these applications 201A to 201F corresponds to the business software 120 in FIG. 1. The business software 120 will be hereinafter referred to the "application(s)" as appropriate.

Furthermore, file systems 202A, 202B named "FS A" and "FS B" and device files 203A, 203B named "DF A" and "DF B" are defined for the host server 101A named the "host server A." File systems 202C, 202D named "FS C" and "FS D" and a device file 203C named "DF C" are defined for the host server 101B named the "host server B." A file system 202E named "FS E" and a device file 203D named "DF D" are defined for the host server 101C named the "host server C."

The file systems 202A to 202E are units by which the OS 121 (FIG. 1) provides a data input/output service and which are used to manage the storage area, to which data is input, in an organized manner. Furthermore, the device files 203A to 203D are managed by the OS 121 as areas in which files are to be stored in an external storage device (the storage apparatus 103A in this example).

The application monitoring agent 122 (FIG. 1) for collecting performance information and configuration information about the applications 201A to 201F mounted on their own server, and the host monitoring agent 123 (FIG. 1) for collecting performance information and configuration information about the file systems 202A to 202E and the device files 203A to 203D defined in their own servers operate on each of these host servers 101A to 101C as described above.

FIG. 2 shows lines connecting the resources. Each of these lines indicates that there is a dependency relationship in terms of data input/output (I/O) between the two resources connected by the relevant line. For example, FIG. 2 shows a line connecting the application 201A named "AP A" and the file system 202A named "FS A"; and this line represents the relationship between them, in which the application 201A named "AP A" issues a read request or a write request to the file system 202A named "FS A." A line connecting the file systems 202A, 202B named "FS A" and "FS B" and the device file 203A named "DF A" represents the relationship between them, in which I/O load on the file systems 202A, 202B means read/write processing on the device file 203A.

It should be noted that the storage monitoring agent 155 (FIG. 1) operates on the performance and configuration information collection server 106 (FIG. 1) as described earlier in order to obtain the performance information and configuration and capacity information about the storage apparatus 103A although it is omitted in FIG. 2. Resources from which the storage monitoring agent 155 collects the performance information and the configuration and capacity information are at least ports 140A to 140C named "port I" to "port K" on the storage apparatus 103A, virtual volumes 204A to 204D named "VVOL A" to "VVOL D," pools 205A, 205B named "Pool A" and "Pool B," storage tiers 206A to 206D named "Tier A" to "Tier D," pool volumes 207A to 207H named "Pool VOL A" to "Pool VOL I," array groups 144A to 144D named "AG A" to "AG E," and each page in each pool 205A, 205B ("PGA1" to "PGA8," "PGB1" to "PGB18," "PGC1" to "PGC8," and "PGD1" to "PGD12"), which are defined in the storage apparatus 103. Pages will be explained later.

Each array group 144A to 144D is a logical disk drive which is constituted from the same type of one or more storage devices 142A to 142D, and is defined by a function of the control unit 141 (FIG. 1) for the storage apparatus 103A. The array groups 144A to 144D correspond to the array groups 144 in FIG. 1 and the storage devices 142A to 142D correspond to the storage devices 142 in FIG. 1.

The pool volumes 207A to 207H are logical disk drives (real logical volumes) created by a function of the control unit 141 for the storage apparatus 103A by dividing storage areas provided by the array groups 144A to 144D. When creating the pool volumes 207A to 207H, storage areas with a defined capacity are secured in advance in the storage areas provided by the relevant array groups 144A to 144D.

Each storage tier 206A to 206D is a tier of the logical storage devices 142A to 142D created for each storage device type such as SSD or SAS and is constituted from a plurality of pool volumes 207A to 207H which are provided by dividing the storage areas provided by the array groups 144A to 144D constituted from the same type of the storage devices 142A to 142D. The storage tiers 206A to 206D allocate the storage areas on a page basis via the relevant pools 205A, 205B to the virtual volumes 204A to 204D.

Incidentally, partial areas of the pools 205A, 205B corresponding to the pages of the storage tiers 206A to 206D will be hereinafter referred to as the "pool pages" and partial areas of the virtual volumes 204A to 204D corresponding to those pool pages will be hereinafter referred to as the "virtual pages." Allocation of pages by the storage tiers 206A to 206D to the virtual volumes 204A to 204D via the pool volumes 207A to 207D will be hereinafter referred to as "place page(s)" or "page placement."

Each storage tier 206A to 206D has two values: a performance threshold and a capacity threshold. The performance threshold is a value indicating, as described earlier, that "if the I/O quantity per unit time exceeds this value, response performance can no longer be guaranteed." For example, assuming that the performance threshold of the storage tier 206A named "Tier A" as shown in FIG. 2 is "1600" as shown in "1600" and the I/O quantities with respect to pages "PGA1" to "PGA4," "PGB1," "PGB2" located by the storage tier 206A at the virtual volumes 204A, 204B named "VVOL A" and "VVOL B" are as shown in FIG. 5, the sum of the I/O quantities with respect to these pages is "1600." This means that the storage tier 206A has reached the performance threshold.

The capacity threshold is a value indicating, as described earlier, that if the actual capacity usage rate reaches this value, page placement from the storage tiers 206A to 206D to the virtual volumes 204A to 204D is stopped. For example, assuming that the capacity threshold and an actual capacity usage rate of the storage tier 206C named "Tier C" in FIG. 2 are as shown in FIG. 6, the capacity threshold of the storage tier 206C is 90% and its actual capacity usage rate is 90%. This means that this storage tier has reached the capacity threshold.

Each pool 205A, 205B is constituted from the same type or different types of one or more storage tiers 206A to 206D. For example, in the case of FIG. 2, the pool 205A named "Pool A" is constituted from two different types of the storage tiers 206A, 206B named "Tier A" and "Tier B"; and the pool 205B named "Pool B" is constituted from different types of two storage tiers 206C, 206D named "Tier C" and "Tier D."

The virtual volumes 204A to 204D are virtual logical volumes which are unsubstantial and created by a function of the virtual volume management control unit 145 (FIG. 1) for the storage apparatus 103A. These virtual volumes 204A to 204D are recognized as logical disk drives by the host servers 101A to 101C. However, when the virtual volumes 204A to 204D are created, only the capacity of each virtual volume 204A to 204D is defined and a storage area of that defined capacity is not secured. When a write request to a new address of the virtual volume 204A to 204D is received, a necessary amount of page(s) is placed from the relevant storage tiers 206A to 206D.

For example, FIG. 2 shows that pages named "PGA1" to "PGA4" from the storage tier 206A named "TEIR A" and pages named "PGA5" to "PGA8" from the storage tier 206B named "TEIR B" are placed to the virtual volume 204A named "VVOL A." Also, pages named "PGB1" and "PGB2" from "Tier A" and pages named "PGB3" to "PGB18" from "Tier B" are placed to the virtual volume 204B named "VVOL B." Meanwhile, pages named "PGC1" to "PGC8" from the storage tier 206C named "Tier C" are placed to the virtual volume 204C named "VVOL C." Pages named "PGD1" to "PGD8" from "Tier C" and pages named "PGD9" to "PGD12" from "Tier D" are placed to the virtual volume 204D named "VVOL D."

Pages are storage areas allocated from the storage tiers 206A to 206D to the corresponding virtual pages in the virtual volumes 204A to 204D associated with the pools 205A, 205B, which are associated with the storage tiers 206A to 206D, via the corresponding pool pages in the pools 205A, 205B. From which storage tiers 206A to 206D pages should be placed to virtual pages in the virtual volumes 204A to 204D is decided based on the I/O quantity with respect to the corresponding pool pages in the virtual pages in the pools 205A, 205B associated with the virtual volumes 204A to 204D. Specifically speaking, pages are placed from relatively high-performance the storage tiers 206A, 206C to pool pages, whose I/O quantity per unit time is large, in the pools 205A, 205B associated with the virtual volumes 204A to 204D, and pages are placed from relatively low-performance storage tiers 206B, 206D to pool pages whose I/O quantity per unit time is small.

For example, the pool 205A named "Pool A" in FIG. 2 is constituted from the storage tier 206A named "Tier A" and the storage tier 206B named "Tier B." If the type of the storage devices 142A constituting "Tier A" is SSD and the type of the storage devices 142B constituting "Tier B" is SAS, the performance of "Tier A" is higher than that of "Tier B." If the I/O quantity per unit time for each page placed from "Tier A" and "Tier B" to the virtual volumes 204A, 204B is as shown in FIG. 5, the I/O quantity per unit time for the pages ("PGA1" to "PGA4," "PGB1," "PGB2") that "Tier A" places to any of the virtual volumes 204A, 204B ranges from 200 to 400 and the I/O quantity per unit time for pages ("PGA5" to "PGA8," "PGB3" to "PGB18") that "Tier B" places to any of the virtual volumes 204A, 204B ranges from 50 to 100 (see FIG. 5). In this way, pages are placed from the high-performance storage tiers 206A, 206C to the pool pages with a relatively high I/O quantity in the pools 205A, 205B.

Furthermore, in this example, the sum of I/O quantities for the pages placed by "Tier A" to the virtual volumes 204A, 204B is "1600" as calculated by the following formula:

[Formula 1]

$$400+400+200+200+200+200=1600 \quad (1)$$

If the performance threshold of "Tier A" is "1600," the capacity threshold is "90%," and the actual capacity usage rate is "34%" as shown in FIG. 6, "Tier A" has a free capacity, but can no longer allocate any pages.

Incidentally, pages are placed from the storage tiers 206A to 206D to the virtual volumes 204A to 204D, but the entities of the pages are secured in the pool volumes 207A to 207H constituting the storage tiers 206A to 206D.

If relationship information between the resources from the applications 201A to 201F through the file systems 202A to 202E and the device files 203A to 203D to the virtual volumes 204A to 204D is used to establish a link between them, a so-called "I/O path" can be obtained.

For example, the application 201F named "AP F" issues a read request or write request to the file system 202E named "FS E" and this file system 202E is secured in the device file 203D named "DF D." Furthermore, this device file 203D is allocated to the virtual volume 204D named "VVOL D" and this virtual volume 204D issues I/O to the pool 205B named "Pool B." Incidentally, this pool 205B is constituted from two storage tiers 206C, 206D named "Tier C" and "Tier D."

Therefore, in the case of FIG. 2, the I/O load caused by the application 201F named "AP F" passes through the file system 202E named "FS E," the device file 203D named "DF D," the virtual volume 204D named "VVOL D," the pool 205B named "Pool B," the storage tiers 206C, 206D named "Tier C" or "Tier D," any of the pool volumes 207D to 207H named "Pool VOL D" to "Pool VOL I," and the array group 144C, 144D named "AG C" or "AG D," and then reaches the storage devices 142C, 142D such as SSD or SAS.

Incidentally, in the following explanation, numbers indicating the corresponding parts in FIG. 2 will be used as reference numerals for the applications, file systems, device files, virtual volumes, pools, storage tiers, pool volumes, and array groups for ease of explanation. Specifically speaking, the following references numerals will be used for the relevant resources: "201" for the applications, "202" for the file systems, "203" for the device files, "204" for the virtual volumes, "205" for the pools, "206" for the storage tiers, and "207" for the pool volumes.

(3) Configuration of Storage Management Software

Figure 3:
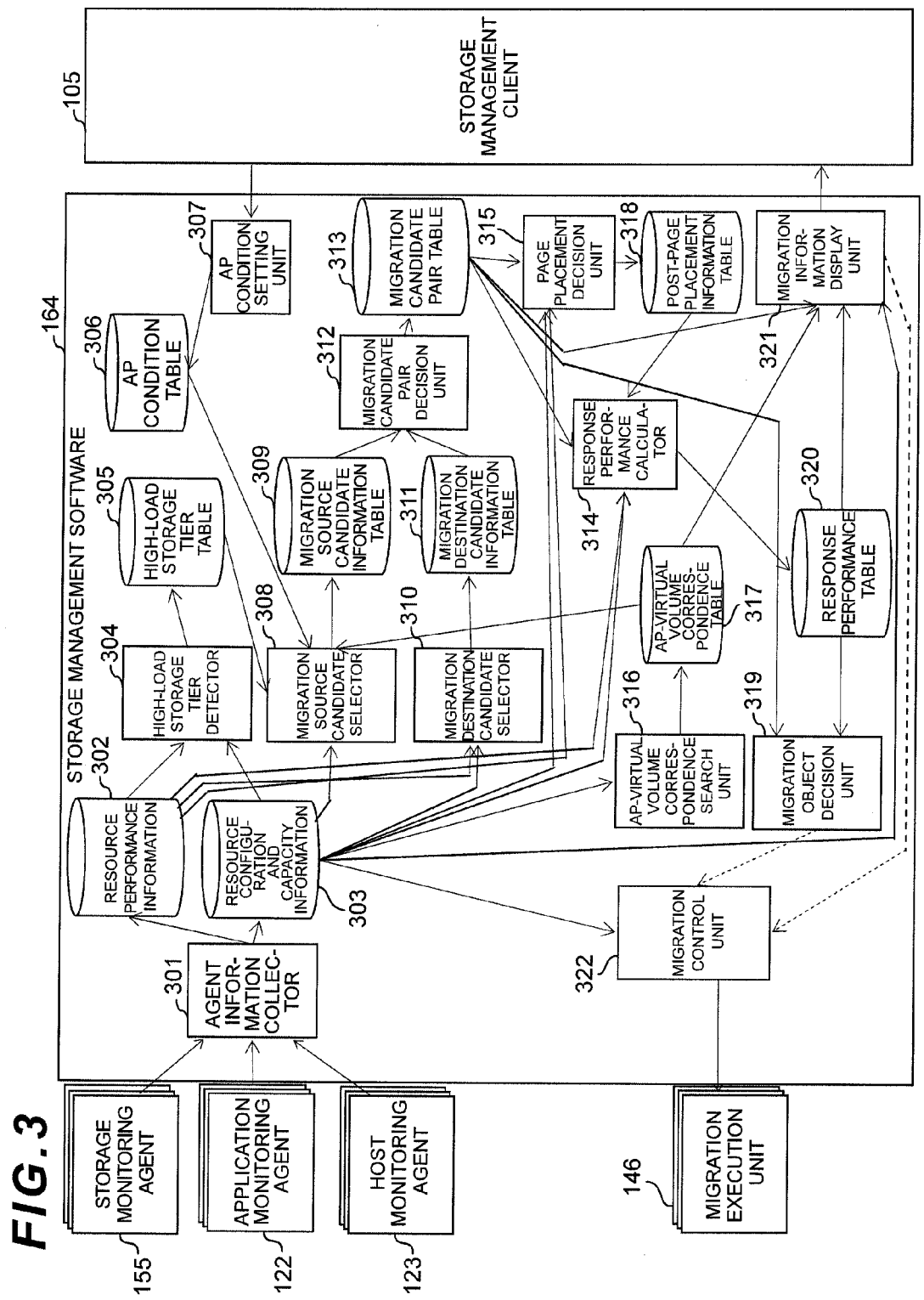
FIG. 3 is a block diagram explaining the configuration of storage management software.

FIG. 3 shows the specific configuration of the storage management software 164. Referring to FIG. 3, an agent information collector 301, a high-load storage tier detector 304, an AP (application) condition setting unit 307, a migration source candidate selector 308, a migration destination candidate selector 310, a migration candidate pair decision unit 312, a response performance calculator 314, a page placement decision unit 315, an AP/virtual volume correspondence search unit 316, a migration object decision unit 319, a migration information display unit 321, and a migration control unit 322 are program modules constituting the storage management software 164.

Also, referring to FIG. 3, resource performance information 302, resource configuration and capacity information 302, a high-load storage tier table 305, an AP condition table 306, a migration source candidate information table 309, a migration destination candidate information table 311, a migration candidate pair table 313, an AP/virtual volume correspondence table 317, a post-page placement information table 318, and a response performance table 320 are information managed by the storage management software 164 and retained in the memory 161 or the hard disk device 162 for the performance monitoring server 107.

The application monitoring agent 122 and the host monitoring agent 123 mounted in the host server 101 and the storage monitoring agent 155 mounted in the performance and configuration information collection server 106 are activated at specified timing (for example, regularly by means of a timer according to a scheduling setting) or activated by the storage management software 164 and then collect necessary performance information and/or configuration and capacity information from monitored object(s) that the relevant agents are in charge of.

The agent information collector 301 for the storage management software 164 is also activated at specified timing (for example, regularly according to a scheduling setting) and then collects the performance information and the configuration and capacity information about monitored object(s), which were collected by the application monitoring agent 122, the host monitoring agent 123, and the storage monitoring agent 155 in the SAN environment, from the application monitoring agent 122, the host monitoring agent 123, and the storage monitoring agent 155. The agent information collector 301 then manages the collected information as resource performance information and resource configuration and capacity information.

The word "resources" herein used is a collective term for hardware constituting the SAN environment (such as a storage apparatus(es), and a host server(s)) and their physical or logical components (such as array groups and logical volumes) as well as programs executed on the hardware (such as business software, database management software, file management system, and volume management software) and their logical components (such as file systems and logical devices).

The resource performance information 302 is information about performance of the object resources, which is collected by the agent information collector 301 from the storage monitoring agent 155; and specifically speaking, the resource performance information 302 is an average I/O quantity per unit time for each page. This information is stored in and managed by the page performance information table 501 described later with reference to FIG. 5.

The resource configuration and capacity information 303 is information about the configuration and capacity of the object resources, which is collected by the agent information collector 301 from the storage monitoring agent 155, the application monitoring agent 122, and the host monitoring agent 123. The details of this resource configuration and capacity information 303 will be explained later.

Meanwhile, the high-load storage tier detector 304 detects the storage tier 206 (see FIG. 2) in a high-load state on the basis of the resource performance information 302 and the resource configuration and capacity information 303 and registers the detected storage tier 206 in the high-load storage tier table 305. The AP condition setting unit 307 displays a list of applications 201 (corresponding to the business software 120) on the storage management client 105; and registers whether or not data to be used by each application 201 can be migrated within the storage apparatus 103 or between the storage apparatuses 103 (such possibility of data migration is set by the user to each application 201 based on the above-mentioned application list) in the AP condition table 306.

The migration source candidate selector 308 registers, in the migration source candidate information table 309, the virtual volumes 204 (virtual volumes from or to which the relevant application 201 reads or writes data) related to an application for which the data migration is set to "possible" in the AP condition table 306, from among the virtual volumes 204 (see FIG. 2) to which the storage tier 206 in a high-load state registered in the high-load storage tier table 305 places pages.

The migration destination candidate selector 310 searches, based on the resource performance information 302 and the resource configuration and capacity information 303, for a pool 205 constituted from the storage tier 206 for which the sum of the I/O quantities per unit time for pages placed in the virtual volumes 206 has not reached the performance threshold, excluding the pools 205 associated with the migration-candidate virtual volumes 204 (see FIG. 2); and then stores the pool 205 as a data migration destination for the migration-candidate virtual volumes 204 in the migration destination candidate information table 311.

The migration candidate pair decision unit 312 combines the virtual volumes 204 registered in the migration source candidate information table 309 with the pools 205 registered in the migration destination candidate information table 311 in all the combination patterns, thereby creating a plurality of pairs constituted from the data-migration-candidate virtual volumes 204 and the migration destination pools 205 (hereinafter referred to as the "migration candidate pair(s)"); and then registers each created migration candidate pair in the migration candidate pair table 313.

The page placement decision unit 315 calculates the number of pages to be located by each storage tier 206 to the virtual volumes 204 with respect to each migration candidate pair registered in the migration candidate pair table 313 when data of the migration-candidate virtual volume 204 is migrated from the relevant migration-candidate virtual volume 204 from the relevant migration source pool (hereinafter referred to as the "migration source pool"), which is associated with the migration-candidate virtual volume 204, to the relevant migration destination pool (hereinafter referred to as the "migration destination pool") 205; and the page placement decision unit 315 stores the result of calculation in the post-page placement information table 318.

The response performance calculator 314 calculates, with respect to each migration candidate pair registered in the migration candidate pair table 313 and based on the resource performance information 302, the resource configuration and capacity information 303, and the post-page placement information table 318, response performance of each of the entire computer system 100, the migration source pool 205, and the migration destination pool 205 before migrating data of the migration-candidate virtual volume 204 to the migration destination pool 205, as well as response performance of each of the entire computer system 100, the migration source pool 205, and the migration destination pool 205 after the data migration; and the response performance calculator 314 stores the results of calculation in the response performance table 320.

The AP/virtual volume correspondence search unit 316 creates relationship information indicating the correspondence relationship between the applications 201 mounted in the host server 101 (FIG. 1) and the virtual volumes 204 defined in the storage apparatus 103 (FIG. 1) based on the resource configuration and capacity information 303 and stores the created relationship information in the AP/virtual volume correspondence table 317.

The migration object decision unit 319 selects, based on the response performance table 320, a migration candidate pair that has the largest difference in the response performance of the entire computer system 100 before and after the data migration, as the migration candidate pair for which migration should be executed, from among the migration candidate pairs registered in the migration candidate pair table 313; and the migration object decision unit 319 issues a migration execution request to the migration control unit 322, demanding that data of the migration-candidate virtual volume 204 of the selected migration candidate pair should be migrated to the migration destination pool 205 of the migration candidate pair.

The migration information display unit 321 obtains, with respect to each migration candidate pair registered in the migration candidate pair table 313, performance information about each of the entire computer system 100, the migration source pool 205, and the migration destination pool 205 before data migration of the relevant migration candidate pair, as well as performance information about each of the entire computer system 100, the migration source pool 205, and the migration destination pool 205 after the data migration from the response performance table 320; and has the storage management client 105 display a migration information display screen 401 (described later with reference to FIG. 4) which shows the obtained performance information.

If a manual mode is set as the operation mode for the data migration, and a desired migration candidate pair is selected by a user on the migration information display screen 401 and an instruction to execute data migration processing on that migration candidate pair is input, the migration information display unit 321 issues a migration execution request to the migration control unit 322, demanding that data stored in the migration-candidate virtual volume 204 constituting the selected migration candidate pair should be migrated to the migration destination pool 205 constituting the migration candidate pair.

In response to the migration execution request from the migration object decision unit 319 or the migration information display unit 321, the migration control unit 322 issues a data migration execution command similar to the above instruction to the migration execution unit 146 for the storage apparatus 103.

(4) Configuration of Migration Information Display Screen

FIG. 4 shows a configuration example for the migration information display screen 401 displayed by the migration information display unit 321 (FIG. 3) on the display device for the storage management client 105 (FIG. 1). This migration information display screen 401 is a GUI screen for displaying the performance information, which is calculated by the response performance calculator 314 described above with reference to FIG. 3, about each of the entire computer system 100, the migration source pool 205 (see FIG. 2), and the migration destination pool 205 before and after data migration for each migration candidate pair registered in the migration candidate pair table 313.

This migration information display screen 401 includes a migration candidate pair information list 402 and a migration execution button 403. The migration candidate pair information list 402 includes a migration-candidate virtual volume column 410, a migration source pool column 411, a migration destination pool column 412, a system response performance column 413, a migration source pool response performance column 414, a migration destination pool response performance column 415, a migration-candidate virtual volume using AP column 416, a migration destination pool using AP column 417, and a migration execution candidate selection column 418. One line in the migration candidate pair information list 402 corresponds to one migration candidate pair registered in the migration candidate pair table 313 (FIG. 3).

The migration-candidate virtual volume column 410, the migration source pool column 411, and the migration destination pool column 412 display an identifier of the migration-candidate virtual volume 204 (see FIG. 2) of the relevant migration candidate pair registered in the migration candidate pair table 313, an identifier of the migration source pool 205 of that migration candidate pair, and an identifier of the migration destination pool 205 of that the migration candidate pair, respectively.

The system response performance column 413, the migration source pool response performance column 414, and the migration destination pool response performance column 415 display response performance in milliseconds (ms) of the entire computer system 100, the migration source pool 205, and the migration destination pool 205 before and after data migration, respectively.

Furthermore, the migration-candidate virtual volume using AP column 416 displays identifiers of all the applications 201 using the migration-candidate virtual volume 204 of the relevant migration candidate pair, and the migration destination pool using AP column 417 displays identifiers of all the applications 201 using the virtual volume 204 associated with the migration destination pool 205 of the migration candidate pair.

Furthermore, the migration execution candidate selection column 418 displays a check box 420. On the migration information display screen 401, a desired migration candidate pair can be selected by clicking the check box 420 for that migration candidate pair; and a check mark 421 will be displayed in the check box 420 corresponding to the selected migration candidate pair.

In this way, the user refers to the performance information before and after migration about each migration candidate pair displayed in the migration candidate pair information list 402 on the migration information display screen 401, makes the check mark 421 displayed in the relevant check box 420 of a desired migration candidate pair, and then clicks the migration execution button 403, so that the user can input a migration execution instruction on the selected migration candidate pair.

(5) Configuration of Various Information

Next, the configuration of various information (including tables) managed and used by each program module for the storage management software 164 will be explained.

(5-1) Configuration of Resource Performance Information

The resource performance information 302 (FIG. 3) is managed in a table format as shown in FIG. 5. The table shown in FIG. 5 will be referred to as the page performance information table 501.

This page performance information table 501 is a table for retaining and managing an average I/O quantity per unit time of each page placed to the virtual volumes 204 in the storage apparatus 103, which is collected by the agent information collector 301 (FIG. 3) from the storage monitoring agent 155 (FIG. 3); and the page performance information table 501 includes a page identifier column 502 and an average I/O quantity column 503 as shown in FIG. 5.

The page identifier column 502 stores identifiers of all the pages in all the virtual volumes 204 (FIG. 2) defined in the storage apparatus 103, and the average I/O quantity column 503 stores the average I/O quantity per unit time (for example, the I/O quantity per second) of the relevant page.

Therefore, FIG. 5 shows that the average I/O quantity per unit time of, for example, all the pages named "PG A1" to "PG A4" is "200," the average I/O quantity per unit time of all the pages named "PG A5" to "PG A8" is "100," and the average I/O quantity per unit time of all the pages named "PG B1" and "PG B2" is "400."

(5-2) Configuration of Resource Configuration and Capacity Information

The resource configuration and capacity information 303 is constituted from a storage tier configuration information table 601 (FIG. 6), a virtual volume/page/pool/storage tier correspondence table 701 (FIG. 7), an AP/file system correspondence table 801 (FIG. 8), a file system/device file correspondence table 901 (FIG. 9), an AP/device file correspondence table 1001 (FIG. 10), a device file/virtual volume correspondence table 1101 (FIG. 11), and a storage tier response performance table 1201 (FIG. 12) as shown in FIG. 6 to FIG. 12. These tables are also created based on the information collected by the agent information collector 301 from the storage monitoring agent 155, the application monitoring agent 122, and the host monitoring agent 123.

The storage tier configuration information table 601 is a table for managing the storage tiers 206 defined in the storage apparatus 103 and includes a pool identifier column 602, a storage tier identifier column 603, a storage tier type column 604, a capacity threshold column 605, an actual capacity usage rate column 606, and a performance threshold column 607 as shown in FIG. 6.

The storage tier identifier column 603 stores an identifier of each storage tier 206 defined in the storage apparatus 103. The pool identifier column 602 stores an identifier of the pool 205 composed of the relevant storage tier 206. The storage tier type column 604 stores the type (such as SSD or SAS) of the storage devices 142 providing storage areas of that storage tier 206.

The capacity threshold column 605 stores a capacity threshold previously set with respect to the relevant storage tier 206 by the user via the storage management client 105. In the case of this embodiment, a threshold of the capacity usage rate (capacity usage threshold value) is stored as this capacity threshold. The actual capacity usage rate column 606 stores a current usage rate (actual capacity usage rate) regarding the capacity of that storage tier 206.

Furthermore, the performance threshold column 607 stores a performance threshold previous set with respect to the relevant storage tier 206 by the user via the storage management client 105. In this embodiment, a threshold of the I/O quantity per unit time is stored as this performance threshold.

Therefore, the example of FIG. 6 shows that, for example, the storage tier 206 named "Tier A" is composed of the storage areas provided by "SSD" and constitutes the pool 205 named "Pool A"; and its capacity usage threshold value is "90%," its current actual capacity usage rate is "34%," and its performance threshold is "1600."

The virtual volume/page/pool/storage tier correspondence table 701 is a table for managing the correspondence relationship between a virtual volume 204 defined in the storage apparatus 103, a storage tier 206 which places a page to that virtual volume, the page placed by that storage tier 206 to the relevant virtual volume 204, and a pool 205 constituted from that storage tier 26; and the virtual volume/page/pool/storage tier correspondence table 701 includes a virtual volume identifier column 702, a page identifier column 703, a pool identifier column 704, and a storage tier identifier column 705 as shown in FIG. 7.

The virtual volume identifier column 702 stores an identifier of the virtual volume 204 defined in the storage apparatus 103, and the storage tier identifier column 705 stores an identifier of the storage tier 206 which places a page to the relevant virtual volume 204. The page identifier column 703 stores an identifier of the page placed by the relevant storage tier 206 to the relevant virtual volume 204, and the pool identifier column 704 stores an identifier of the pool 205 constituted from the relevant storage tier 206.

Accordingly, the example of FIG. 7 shows that, for example, pages named "PG A1" and "PG A2" are placed from the storage tier 206 named "Tier A," which constitutes the pool 205 named "Pool A," to the virtual volume 204 named "VVOL A."

The AP/file system correspondence table 801 is a table for managing the correspondence relationship between an application 201 (see FIG. 2) mounted in the host server 101 and a file system 202 (see FIG. 2) provided in the host server 101 and includes an application identifier column 802 and a file system identifier column 803 as shown in FIG. 8.

The application identifier column 802 stores an identifier of each application 201 mounted in the host server 101, and the file system identifier column 803 stores an identifier of the file system 202 (see FIG. 2) set as a destination to which I/O of the relevant application 201 is issued.

Accordingly, FIG. 8 shows that, for example, the application 201 named "AP A" issues I/O to the file system 202 named "FS A" and the application 201 named "AP B" issues I/O to the file system 202 named "FS B."

The file system/device file correspondence table 901 is a table for managing the correspondence relationship between a file system 202 and a device file 203 (see FIG. 2) defined in the host server 101 and includes a file system identifier column 902 and a device file identifier column 903 as shown in FIG. 9.

The file system identifier column 902 stores an identifier of each file system 202 defined in any of the host servers 101, and the device file identifier column 903 stores an identifier of the device file 203 to which the relevant file system 202 issues I/O.

Accordingly, FIG. 9 shows that, for example, the file system 202 named "FS A" issues I/O to the device file 203 named "DF A" and the file system 202 named "FS B" also issues I/O to the device file 203 named "DF A."

The AP/device file correspondence table 1001 is a table for managing the correspondence relationship between an application 201 and a device file 203 and includes an application identifier column 1002 and a device file identifier column 1003 as shown in FIG. 10.

The application identifier column 1002 stores an identifier of the application 201 mounted in any of the host servers 101, and the device file identifier column 1003 stores an identifier of the device file 203 set as an I/O destination of the relevant application 201.

Accordingly, FIG. 10 shows that the application 201 named "AP C" is set to issue I/O to the device file 203 named "DF B."

The device file/virtual volume correspondence table 1101 is a table for managing the correspondence relationship between the device file 203 and the virtual volume 204 on the storage apparatus 103 side associated with that device file 203 and includes a device file identifier column 1102 and a virtual volume identifier column 1103 as shown in FIG. 11.

The device file identifier column 1102 stores an identifier of the device file 203 defined in any of the host servers 101, and the virtual volume identifier column 1103 stores an identifier of the virtual volume 204 associated with the relevant device file 203 (that is, the virtual volume 204 which issues I/O to the relevant device file 203).

Accordingly, FIG. 11 shows that the device file 203 named "DF A" is associated with the virtual volume 204 named "VVOL A" and the device file 203 named "DF B" is associated with the virtual volume 204 named "VVOL B."

Furthermore, the storage tier response performance table 1201 is a table for managing response performance for each type of the storage tiers 206 (such as SSD, SAS, or SATA) defined in the storage apparatus 103. The types of the storage tiers 206 herein used (hereinafter referred to as the "storage tier types" as appropriate) indicate the types of the storage devices 142 providing storage areas of the pool volumes 207 (see FIG. 2) constituting the relevant storage tier 206.

This storage tier response performance table 1201 includes a storage tier type column 1202 and a response performance column 1203 as shown in FIG. 12. The storage tier type column 1202 stores all the storage device types of the storage tiers 206 existing in the storage apparatus 103 and the response performance column 1203 stores a response speed of the relevant storage device type in milliseconds (ms) under normal load, which is set by the user via the storage management client 105.

Accordingly, FIG. 12 shows that the response speeds of the storage tier types "SSD," "SAS," and "SATA" are "1," "5," and "10," respectively. Therefore, regarding this storage apparatus 103, the response speed of accessing virtual pages in the virtual volumes 204, to which pages are placed from the storage tier 206 of the storage tier type "SSD," can be expected to be "1" ms; the response speed of accessing virtual pages in the virtual volumes 204, to which pages are placed from the storage tier 206 of the storage tier type "SAS," can be expected to be "5" ms; and the response speed of accessing virtual pages in the virtual volumes 204, to which pages are placed from the storage tier 206 of the storage tier type "SATA," can be expected to be "10" ms.

(5-3) Configuration of High-Load Storage Tier Table

The high-load storage tier table 305 is a table for managing storage tiers 206 under high load which are detected by the high-load storage tier detector 304 (FIG. 3) and includes a pool identifier column 305A and a storage tier identifier column 305B as shown in FIG. 13.

The storage tier identifier column 305B stores an identifier of a storage tier 206 under high load, which is detected by the high-load storage tier detector 304, and the pool identifier column 305A stores an identifier of the pool 205 composed of the relevant storage tier 206.

Accordingly, referring to FIG. 13, the high-load storage tier detector 304 detects that the storage tier 206 named "Tier A," which constitutes the pool 205 named "Pool A," is under high load.

(5-4) Configuration of AP Condition Table

The AP condition table 306 is a table for managing, regarding each application 201, whether data used by the relevant application 201 may be migrated to another virtual volume 204 within the same or another storage apparatus 103; and the AP condition table 306 includes an application identifier column 306A and a migration possibility column 306B as shown in FIG. 14.

The application identifier column 306A stores an identifier of each application 201 mounted in any of the host server 101, and the migration possibility column 306B stores information indicating whether data used by the relevant application 201 may be migrated from the current virtual volume 204 to another virtual volume 204.

Accordingly, FIG. 14 shows that, for example, regarding the application 201 named "AP A," data used by that application 201 may be migrated from the current virtual volume 204 to another virtual volume 204 ("possible"), but regarding the application 201 named "AP E," migration of data used by that application 201 from the current virtual volume 204 to another virtual volume 204 is prohibited ("impossible").

Incidentally, possibility of data migration for each application 201 in the AP condition table 1401 is set by the user operating the storage management client 105.

(5-5) Configuration of Migration Source Candidate Information Table

The migration source candidate information table 309 is a table for managing a virtual volume 204 selected as a migration candidate which is selected by the migration source candidate selector 308 (FIG. 3) and whose data is to be migrated to another virtual volume; and the migration source candidate information table 309 includes a virtual volume identifier column 309A and a pool identifier column 309B as shown in FIG. 15.

The virtual volume identifier column 309A stores an identifier of a virtual volume 204 selected as a migration candidate by the migration source candidate selector 308, and the pool identifier column 309B stores an identifier of a pool 205 which allocates a storage area to the relevant virtual volume 204.

Accordingly, FIG. 15 shows that the virtual volume 204 named "VVOL A" associated with the pool 205 named "Pool A" and the virtual volume 204 named "VVOL B" associated with the pool 205 named "Pool B" are selected as migration candidates whose data is to be migrated to other virtual volumes 204.

(5-6) Configuration of Migration Destination Candidate Information Table

The migration destination candidate information table 311 is a table for managing a pool (migration destination pool) 205 selected by the migration destination candidate selector 310 (FIG. 3) as a data migration destination for data of the migration-candidate virtual volume 204, and is composed of a pool identifier column 311A as shown in FIG. 16.

The pool identifier column 311A stores an identifier of a pool 205 selected as a migration destination pool by the migration destination candidate selector 310. Accordingly, FIG. 16 shows that the pool 205 named "Pool B" is selected as the migration destination pool.

(5-7) Configuration of Migration Candidate Pair Table

The migration candidate pair table 313 is a table for managing migration candidate pairs decided by the migration candidate pair decision unit 312 (FIG. 3), and includes a migration candidate pair identifier column 313A, a migration-candidate virtual volume identifier column 313B, a migration source pool identifier column 313C, and a migration destination pool identifier column 313D as shown in FIG. 17.

The migration candidate pair identifier column 313A stores an identifier assigned to the relevant migration candidate pair. The migration-candidate virtual volume identifier column 313B stores an identifier of the migration-candidate virtual volume 204 constituting the relevant migration candidate pair, and the migration source pool identifier column 313C stores an identifier of the migration source pool 205 which is a migration source of data of the relevant migration-candidate virtual volume 204. The migration destination pool identifier column 313D stores an identifier of the migration destination pool constituting the relevant migration candidate pair.

Accordingly, FIG. 13 shows that the migration candidate pair named "M1" is constituted from the migration-candidate virtual volume 204 named "VVOL A" associated with the pool 205 named "Pool A", and the migration destination pool 205 named "Pool B."

(5-8) Configuration of Post-page Placement Information Table

The post-page placement information table 318 is a table for managing the number of pages placed to a virtual volume 204 (a migration-candidate virtual volume 204 with regard to the migration destination pool 205) related to each storage tier 206 constituting a migration source pool 205 and each storage tier 206 constituting a migration destination pool 205 after data migration of a migration candidate pair registered in the migration candidate pair table 313 (FIG. 17). This post-page placement information table 318 includes a migration candidate pair identifier column 318A, a pool identifier column 318B, a storage tier identifier column 318C, and a number-of-pages-placed-after-placement-change column 318D.

The migration candidate pair identifier column 318A stores an identifier of each migration candidate pair registered in the migration candidate pair table 313, and the pool identifier column 318B stores an identifier of the migration source pool 205 or the migration destination pool 205 of the relevant migration candidate pair. The storage tier identifier column 318C stores an identifier of each storage tier 206 constituting the relevant migration source pool 205 or the migration destination pool 205, and the number-of-pages-placed-after-placement-change column 318D stores the number of pages placed by the relevant storage tier 206 to the virtual volume 204 related to the migration source pool 205 or the migration destination pool 205 after migrating data of the migration-candidate virtual volume 204.

Accordingly, FIG. 18 shows that if data of the migration-candidate virtual volume 204 is migrated for the migration candidate pair named "M1," the storage tiers 206 named "Tier A" and "Tier B" constituting the migration source pool 205 named "Pool A" place a total of "16" and "2" pages, respectively, to the virtual volumes 204 related to "Pool A"; and the storage tiers 206 named "Tier C" and "Tier D" constituting the migration destination pool 205 named "Pool B" place a total of "16" and "12" pages, respectively, to the virtual volumes 204 related to "Pool B."

(5-9) Configuration of Response Performance Table

The response performance table 320 is a table for managing response performance of the entire storage apparatus 103 before and after data migration, response performance of the migration source pool 205 before and after the data migration, and response performance of the migration destination pool 205 before and after the data migration when data is migrated for a migration candidate pair registered in the migration candidate pair table 313; and the response performance table 320 includes a migration candidate pair identifier column 320A, a pre-migration system response performance column 320B, a post-migration system response performance column 320C, a pre-migration migration source pool response performance column 320D, a post-migration migration source pool response performance column 320E, a pre-migration migration destination pool response performance column 320F, and a post-migration migration destination pool response performance column 320G as shown in FIG. 19.

The migration candidate pair identifier column 320A stores an identifier of the relevant migration candidate pair from among the migration candidate pairs registered in the migration candidate pair table 313. The pre-migration system response performance column 320B stores an average value of response time of the entire computer system 100 before data migration for the relevant migration candidate pair, and the post-migration system response performance column 320C stores an average value of response time of the entire computer system 100 after the data migration for the relevant migration candidate pair.

The pre-migration migration source pool response performance column 320D stores an average value of response time of the migration source pool 205 before the data migration for the relevant migration candidate pair, and the post-migration migration source pool response performance column 320E stores an average value of response time of the migration source pool 205 after the data migration for the relevant migration candidate pair.

Furthermore, the pre-migration migration destination pool response performance column 320F stores an average value of response time of the migration destination pool 205 before the data migration for the relevant migration candidate pair, and the post-migration migration destination pool response performance column 320G stores an average value of response time of the migration destination pool 205 after the data migration for the relevant migration candidate pair.

Accordingly, FIG. 19 shows that if data is migrated for the migration candidate pair named "M1" registered in the migration candidate pair table 313, the response time of the entire computer system 100, the migration source pool 205, and the migration destination pool 205 before the data migration is "3.1" ms, "4.1" ms, and "1.8" ms, respectively; and the response time of the entire computer system 100, the migration source pool 205, and the migration destination pool 205 after the data migration is "2.2" ms, "1.4" ms, and "2.7" ms.

(5-10) Configuration of AP/Virtual Volume Correspondence Table

The AP/virtual volume correspondence table 2001 is a table for managing an application 201 and a virtual volume 204 (the application 201 and the virtual volume 204 from or to which that application reads or writes data) which are detected by the AP/virtual volume correspondence search unit 316 and are related to each other; and the AP/virtual volume correspondence table 2001 includes an application identifier column 317A and a virtual volume identifier column 317B as shown in FIG. 20.

The application identifier column 317A stores an identifier of each application 201 mounted in the host server 101, and the virtual volume identifier column 317B stores an identifier of the virtual volume 204 coupled to the relevant application 201 via an I/O path (that is, the virtual volume from or to which the relevant application 201 reads or writes data).

Accordingly, FIG. 20 shows that, for example, the application 201 named "AP A" is coupled to the virtual volume 204 named "VVOL A" via the I/O path, and this virtual volume 204 named "VVOL A" is coupled to the application 201 named "AP B" via the I/O path.

(6) Various Processing by Storage Management Software

Next, the content of various processing executed by each program module for the storage management software 164 will be explained with reference to FIG. 21 to FIG. 31.

(6-1) System Performance Management Processing

Figure 21:
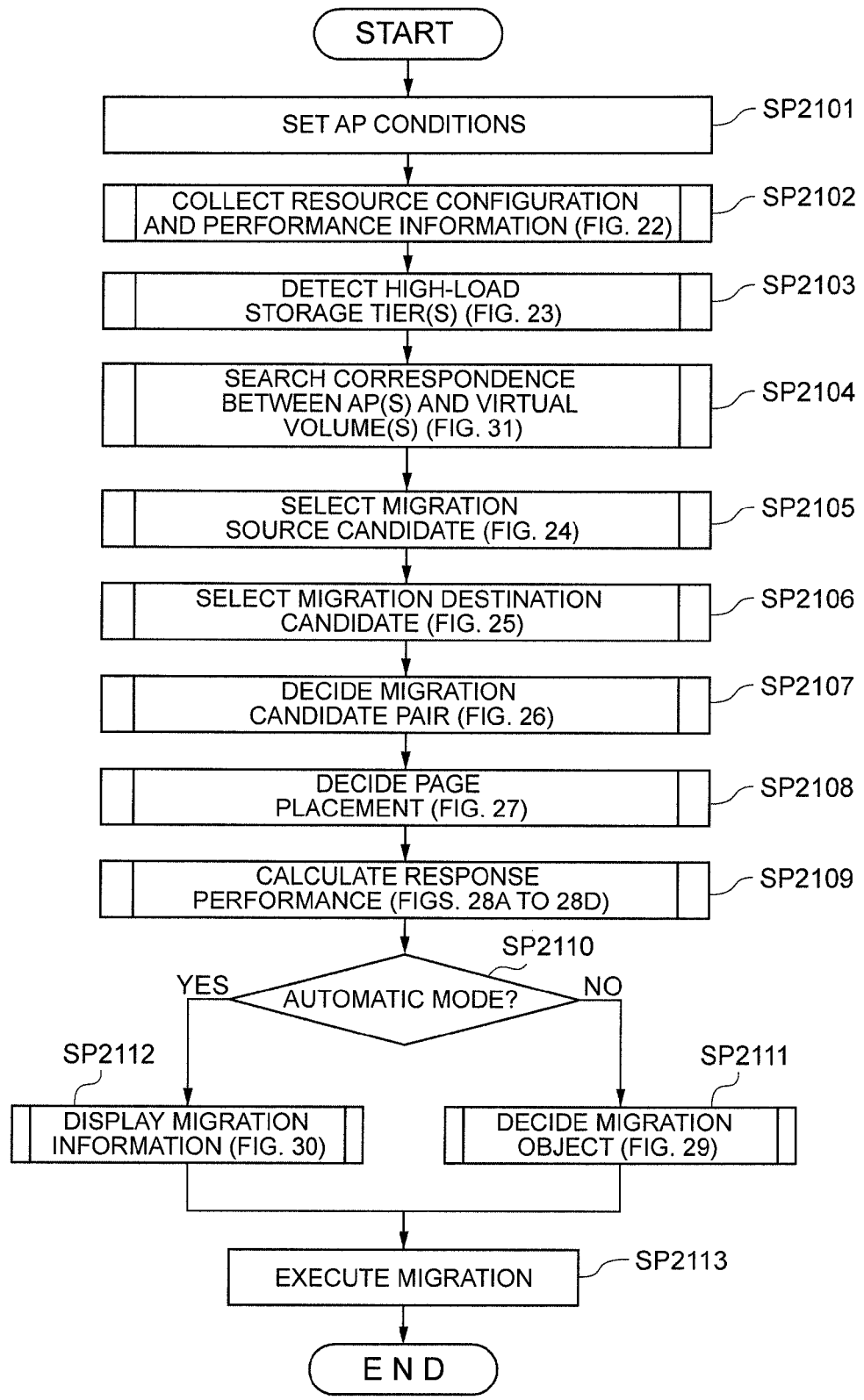
FIG. 21 is a flowchart illustrating a sequence of system performance management processing.

FIG. 21 shows a flow of system performance management processing executed by the storage management software 164. The storage management software 164 manages the performance of the computer system 10 in accordance with the processing sequence shown in FIG. 21.

With the storage management software 164, the AP condition setting unit 307 (FIG. 3) sets migration possibility of each application 201 designated by the user operating the storage management client 105 by registering the migration possibility in the AP condition table 306 (FIG. 14) (SP2101).

Subsequently, the agent information collector 301 (FIG. 3) collects the performance information and the configuration and capacity information of each resource from the storage monitoring agent 155, the application monitoring agent 122, and the host monitoring agent 123. The agent information collector 301 stores the performance information, from among the collected performance information, and configuration and capacity information of each resource, in the page performance information table 501 (FIG. 5) constituting the resource performance information 302 (FIG. 3). The agent information collector 301 stores the configuration and capacity information, from among the collected performance information, and configuration and capacity information of each resource, in the storage tier configuration information table 601 (FIG. 6), the virtual volume/page/pool/storage tier correspondence table 701 (FIG. 7), the AP/file system correspondence table 801 (FIG. 8), the file system/device file correspondence table 901 (FIG. 9), the AP/device file correspondence table 1001 (FIG. 10), the device file/virtual volume correspondence table 1101 (FIG. 11), and the storage tier response performance table 1201 (FIG. 12) (SP2102).

Next, the high-load storage tier detector 304 (FIG. 3) detects a storage tier(s) 206 under high load from among the storage tiers 206 which places pages to the virtual volumes 204; and then registers the storage tier(s) 206 in the high-load storage tier table 305 (FIG. 13) (SP2103).

Then, the AP/virtual volume correspondence search unit 316 searches, based on the resource configuration and capacity information 303, for the correspondence relationship between the applications 201 and the virtual volumes 204, indicating which application 201 uses which virtual volume 204; and then registers the search result in the AP/virtual volume correspondence table 317 (SP2104).

Subsequently, the migration source candidate selector 308 selects a virtual volume 204 which is a migration candidate, from among the virtual volumes 204 to which the storage tiers 206 registered in the high-load storage tier table 305 place pages; and then registers the selected virtual volume 204 in the migration source candidate information table 309 (SP2105).

Next, the migration destination candidate selector 310 detects a storage tier 206 regarding which the sum of the I/O quantities per unit time with respect to the pages placed to the virtual volume 204 is less than the performance threshold; selects a pool 205 constituted from that storage tier 206 as a migration destination pool for the migration-source-candidate virtual volume 204 selected by the migration source candidate selector 308; and registers the selected migration destination pool 205 in the migration destination candidate information table 311 (SP2106).

Furthermore, the migration candidate pair decision unit 312 combines the migration-candidate virtual volume(s) 204 registered in the migration source candidate information table 309 and the migration destination pool(s) 205 registered in the migration destination candidate information table 311 sequentially in all the combination patterns, thereby generating one or more migration candidate pairs; and registers one or more migration candidate pairs in the migration candidate pair table 313 (SP2107).

Next, regarding each migration candidate pair registered in the migration candidate pair table 313, the page placement decision unit 315 simulates the reallocated state of pages of the relevant storage tier 206 after migrating data of the migration-candidate virtual volume 204 to the migration destination pool 205, thereby counts the number of pages placed by each storage tier 206 after the data migration (after page reallocation), and then registers the count value in the post-page placement information table 318 (SP2108).

Subsequently, regarding each migration candidate pair registered in the migration candidate pair table 313, the response performance calculator 314 calculates response time of the entire computer system 100 before and after data migration, and response time of the migration source pool 205 and the migration destination pool 205 before and after the data migration, and registers the calculation results in the response performance table 320 (SP2109).

If an automatic mode is set as the operation mode for the data migration, the migration object decision unit 319 decides, as an object on which the data migration processing should be executed, a migration candidate pair regarding which the response time of the entire computer system 100 after the data migration is shorter than the response time of the entire computer system 100 before the data migration and the difference between the response time before the data migration and the response time after the data migration is the largest, from among the migration candidate pairs registered in the migration candidate pair table 313 (SP2111).

Next, the migration control unit 322 controls the migration execution unit 146 for the storage apparatus 103 (FIG. 1) and thereby executes the data migration processing on data stored in the migration-candidate virtual volume 204 of the migration candidate pair which was decided as the data migration processing execution object in step SP2110 by the migration object decision unit 319 (SP2113); and then this system performance management processing terminates.

If a manual mode is set as the operation mode, the migration information display unit 321 displays the migration information display screen 401 described with reference to FIG. 4 on the storage management client 105 on the basis of, for example, the migration candidate pair table 313 and the response performance table 320 (SP2112).

Subsequently, if the migration candidate pair which is the data migration processing execution object is selected on the migration information display screen 401 and an instruction to execution the data migration processing on the selected migration candidate pair is input to the migration information display screen 401, the migration control unit 322 controls the migration execution unit 146 for the storage apparatus 103 and thereby executes the data migration processing on the data stored in the migration-candidate virtual volume 204 of the migration candidate pair selected on the migration information display screen 401 (SP2113); and then this system performance management processing terminates.

(6-2) Agent Information Collection Processing

Figure 22:
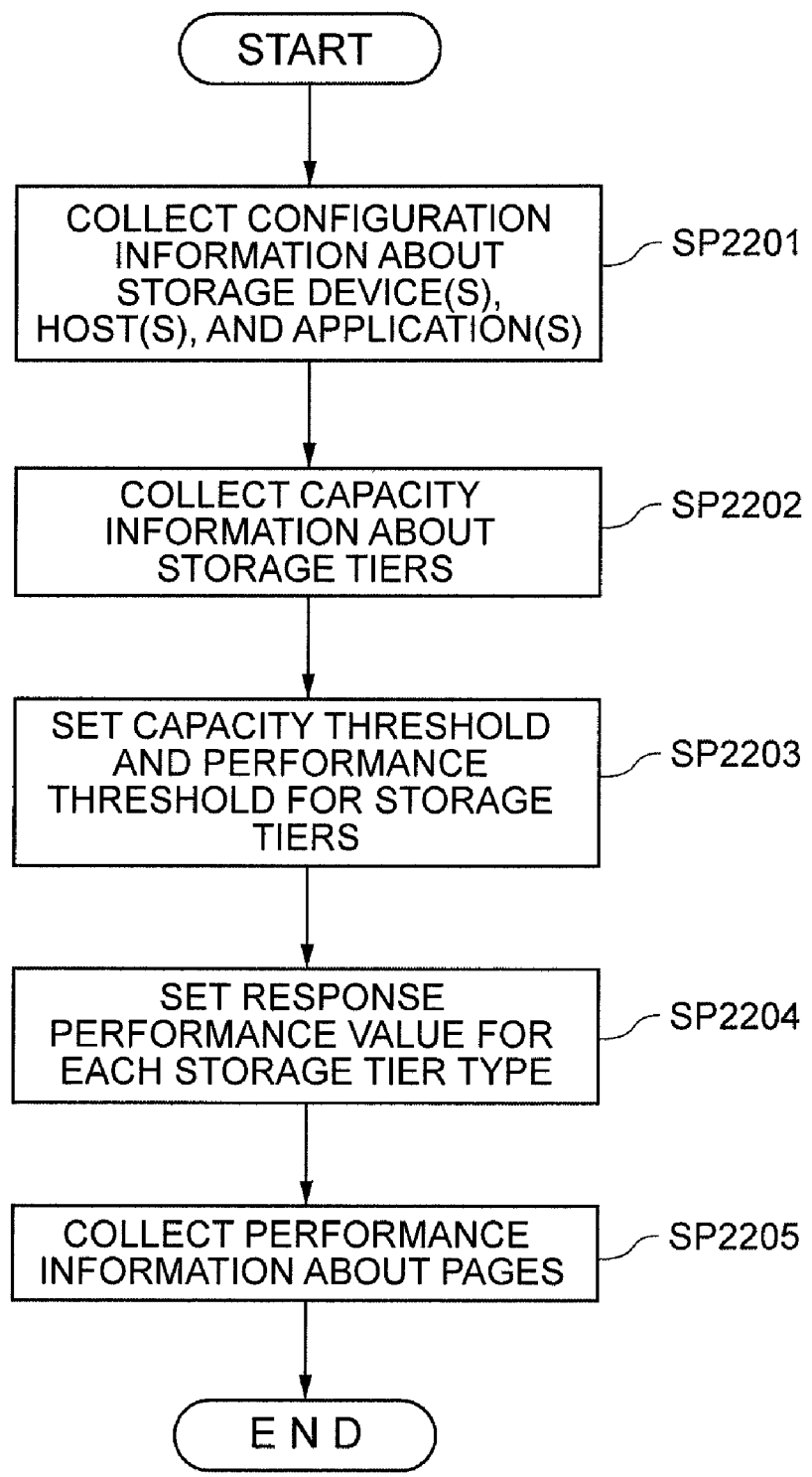
FIG. 22 is a flowchart illustrating a processing sequence of agent information collection processing.

FIG. 22 shows a processing sequence for the agent information collection processing executed by the agent information collector 301 (FIG. 3) in step SP2102 of the above-described system performance management processing (FIG. 21).

After the agent information collector 301 is activated according to a periodic activation schedule, it starts the agent information collection processing shown in FIG. 22. The agent information collector 301 firstly collects the configuration information about the storage apparatus(es) 103, the host server(s) 101, and the application(s) (business software 120) from the storage monitoring agent 155, the host monitoring agent 123, and the application monitoring agent 122 and stores the collected information as the resource configuration and capacity information 303 (FIG. 3) (SP2201).

Specifically speaking, the agent information collector 301 collects the configuration information about each storage tier 206 defined in the storage apparatus 103 and stores it in the storage tier configuration information table 601 (FIG. 6). The agent information collector 301 also collects information indicating the correspondence relationship between the virtual volumes 204, pages, pools 205, and storage tiers 206 defined in the storage apparatus 103 and stores it in the virtual volume/page/pool/storage tier correspondence table 701 (FIG. 7).

Furthermore, the agent information collector 301 collects information indicating the correspondence relationship between the applications 201 mounted in the host server 101 and the file systems 202 defined in the host server 101 and then stores it in the AP/file system correspondence table 801 (FIG. 8). The agent information collector 301 collects information indicating the correspondence relationship between the file systems 202 (FIG. 3) defined in the host server 101 and the device files 203 (FIG. 2) defined in the host server 101 and then stores it in the file system/device file correspondence table 901 (FIG. 9).

Furthermore, the agent information collector 301 collects information indicating the correspondence relationship between the applications 201 (see FIG. 2) mounted in the host server 101 and the device files 203 defined in the host server 101 and then stores it in the AP/device file correspondence table 1001 (FIG. 10). The agent information collector 301 collects information indicating the correspondence relationship between the device files 203 defined in the host server 101 and the virtual volumes 204 to which the relevant device files 203 issue I/O; and then stores it in the device file/virtual volume correspondence table 1101 (FIG. 11).

Subsequently, the agent information collector 301 collects the actual capacity usage rate of each storage tier 206 defined in the storage apparatus 103 from the storage monitoring agent 155 and stores it in the storage tier configuration information table 601 (SP2202). The agent information collector 301 obtains the capacity threshold and the performance threshold of each storage tier 206, which were set in advance by the user via, for example, the storage management client 105, by reading them from, for example, a work memory and then stores them in the storage tier configuration information table 601 (SP2203). Incidentally, the capacity threshold and the performance threshold may be defined by the storage apparatus 103. In this case, the agent information collector 301 collects the capacity threshold and the performance threshold defined by the storage apparatus 103 from the storage monitoring agent 155 and stores them in the storage tier configuration information table 601.

Next, the agent information collector 301 obtains a response performance value of each storage tier type, which was set in advance by the user via, for example, the storage management client 105, by reading it from, for example, a work memory and then stores it in the storage tier response performance table 1201 (FIG. 12) (SP2204). Incidentally, the response performance value of each storage tier may be defined by the storage apparatus 103. In this case, the agent information collector 301 collects the response performance value of each storage tier, which is defined by the storage apparatus 103, from the storage monitoring agent 155 and stores it in the storage tier response performance table 1201.

Furthermore, the agent information collector 301 collects the average I/O quantity per unit time with respect to each page of each virtual volume 204 from the storage monitoring agent 155 and stores it in the page performance information table 501 (FIG. 5) (SP2205). Then, the agent information collector 301 terminates this agent information collection processing.

(6-3) High-load Storage Tier Detection Processing

Figure 23:
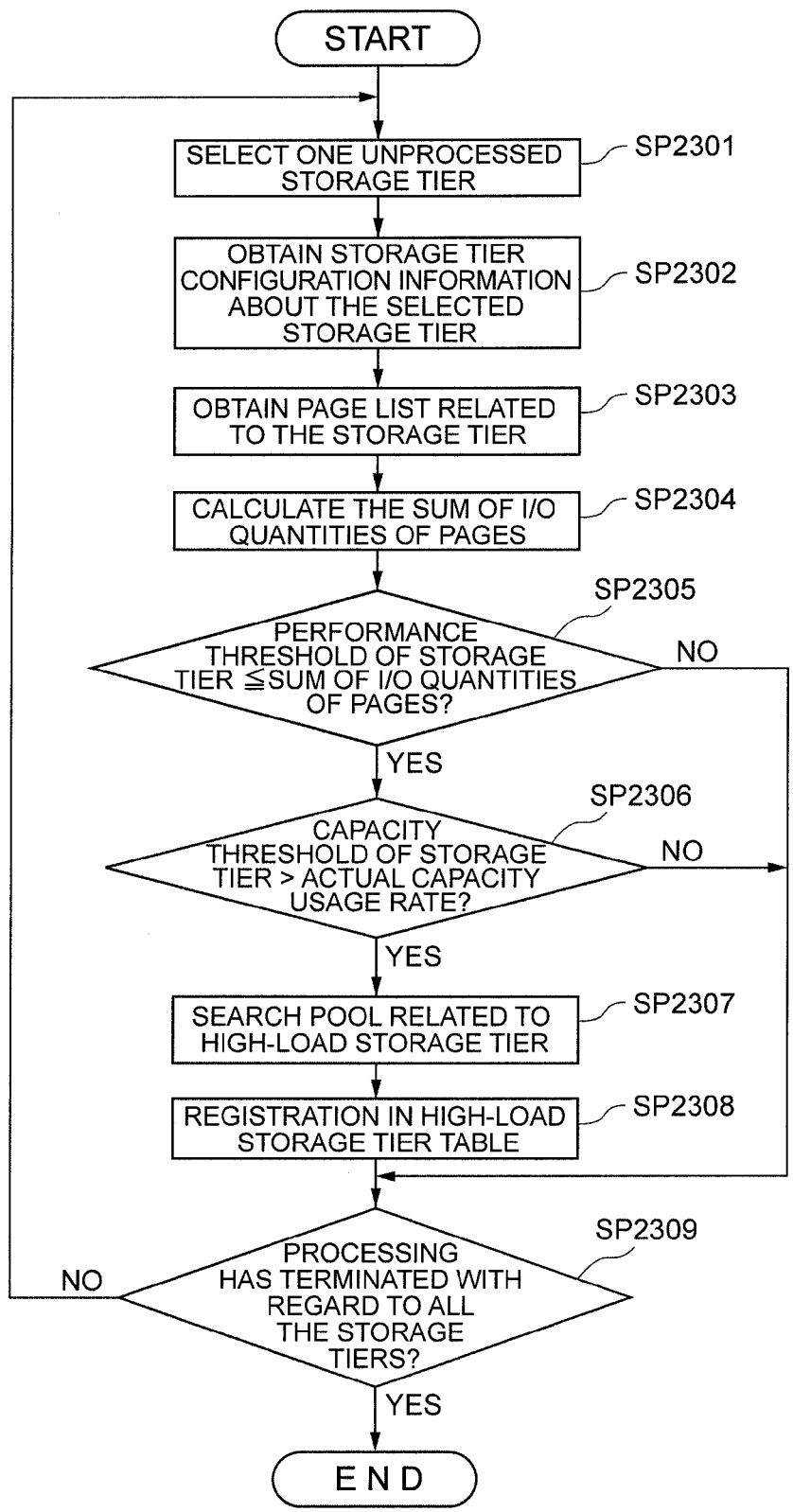
FIG. 23 is a flowchart illustrating a processing sequence of high-load storage tier detection processing.

Meanwhile, FIG. 23 shows a processing sequence for the high-load storage tier detection processing executed by the high-load storage tier detector 304 (FIG. 3) in step SP2103 of the system performance management processing (FIG. 21) described earlier.

The high-load storage tier detector 304 is activated regularly, for example, according to the scheduling setting or by the agent information collector 301 which has finished the aforementioned agent information collection processing (FIG. 22). After the high-load storage tier detector 304 is activated, it starts the high-load storage tier detection processing shown in FIG. 23 and firstly selects one storage tier 206, on which processing from step SP2302 to step SP2308 described below has not been executed, from among the storage tiers 206 whose identifiers are stored in the storage tier identifier column 603 in the storage tier configuration information table 601 (FIG. 6) (SP2301).

The high-load storage tier detector 304 obtains the storage tier type, capacity threshold, actual capacity usage rate, and performance threshold of the then selected storage tier 206 from the storage tier configuration information table 601 (SP2302).

Next, the high-load storage tier detector 304 obtains a list of pages, which are placed by that storage tier 206 to any of the virtual volumes 204, from the virtual volume/page/pool/storage tier correspondence table 701 (FIG. 7) (SP2303), and calculates the sum of the average I/O quantities per unit time of these pages by referring to the page performance information table 501 (FIG. 5) (SP2304).

Subsequently, the high-load storage tier detector 304 judges whether or not the sum of the average I/O quantities per unit time calculated in step SP2304 is equal to or more than the performance threshold of that storage tier 206 obtained from the storage tier configuration information table 601 in step SP2302 (SP2305). If a negative judgment is returned in this step, the high-load storage tier detector 304 proceeds to step SP2309.

On the other hand, if an affirmative judgment is returned in step SP2305, the high-load storage tier detector 304 judges, based on the actual capacity usage rate and the capacity threshold of the relevant storage tier 206 which were obtained from the storage tier configuration information table 601 in step SP2302, whether the actual capacity usage rate is less than the capacity threshold or not (SP2306).

If an affirmative judgment is returned in step SP2306, the high-load storage tier detector 304 searches the virtual volume/page/pool/storage tier correspondence table 701 (FIG. 7) for the pool 205 constituted from the relevant storage tier 206 (SP2307), and then registers the identifier of the pool 205 detected by the search and the identifier of that storage tier 206 in the high-load storage tier table 305 (SP2308).

Next, the high-load storage tier detector 304 judges whether or not the execution of the processing from step SP2302 to step SP2308 has terminated with regard to all the storage tiers 206 whose identifiers are stored in the storage tier identifier column 603 in the storage tier configuration information table 601 (FIG. 6) (SP2309). If a negative judgment is returned in this step, the high-load storage tier detector 304 returns to step SP2301 and repeats the same processing.

Then, when the high-load storage tier detector 304 has eventually finished executing the processing from step SP2302 to step SP2308 with regard to all the storage tiers 206 whose identifiers are stored in the storage tier identifier column 603 in the storage tier configuration information table 601 and an affirmative judgment is thereby returned in step SP2309, the high-load storage tier detector 304 terminates the high-load storage tier detection processing.

(6-4) AP/Virtual Volume Correspondence Search Processing

Figure 31:
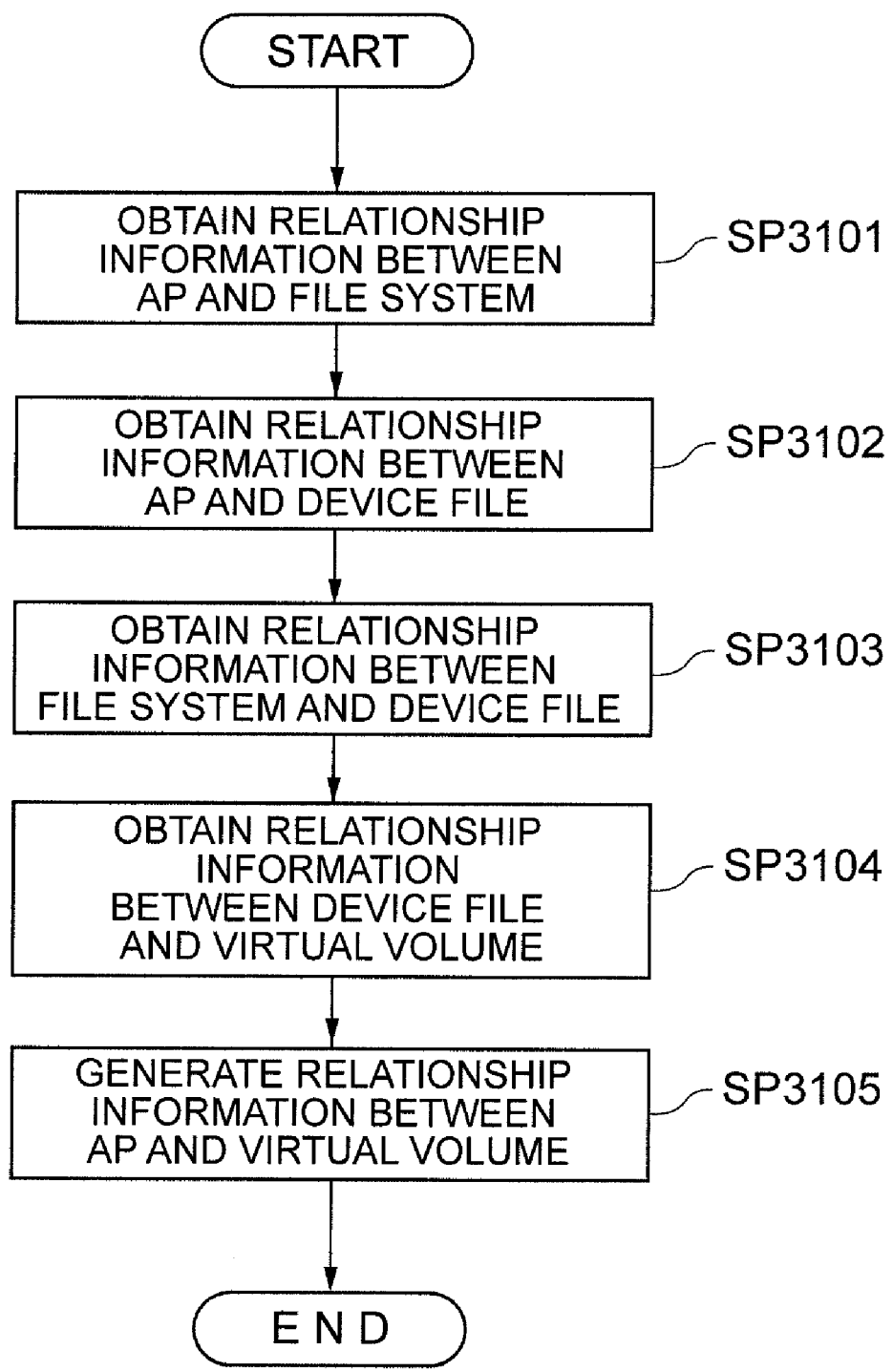
FIG. 31 is a flowchart illustrating a processing sequence of AP/virtual volume correspondence search processing.

FIG. 31 shows a processing sequence for the AP/virtual volume correspondence search processing executed by the AP/virtual volume correspondence search unit 316 in step SP2104 of the system performance management processing (FIG. 21) described earlier.

The AP/virtual volume correspondence search unit 316 is activated regularly, for example, according to the scheduling setting. After the AP/virtual volume correspondence search unit 316 is activated, it starts the AP/virtual volume correspondence search processing shown in FIG. 31 and firstly obtains relationship information between an application 201 mounted in the host server 101 (see FIG. 2) and a file system 202 defined in that host server 101 (see FIG. 2) from the AP/file system correspondence table 801 (SP3101).

Subsequently, the AP/virtual volume correspondence search unit 316 obtains the relationship information between the application 201 mounted in the host server 101 and a device file 203 defined in that host server 101 (see FIG. 2) from the AP/device file correspondence table 1001 (FIG. 10) (SP3102).

Next, the AP/virtual volume correspondence search unit 316 obtains the relationship information between the file system 202 and the device file 203 defined in the host server 101 from the file system/device file correspondence table 901 (FIG. 9) (SP3103).

Furthermore, the AP/virtual volume correspondence search unit 316 obtains the relationship information between the file system 202 defined in the host server 101 and a virtual volume 204 defined in the storage apparatus 103 from the device file/virtual volume correspondence table 1101 (SP3104).

Subsequently, the AP/virtual volume correspondence search unit 316 generates relationship information between the application 201 and the virtual volume 204 based on each piece of the relationship information obtained from step SP3101 to step SP3104, stores it in the AP/virtual volume correspondence table 317 (FIG. 20) (SP3105), and then terminates this AP/virtual volume correspondence search processing.

(6-5) Migration Source Candidate Selection Processing

Figure 24:
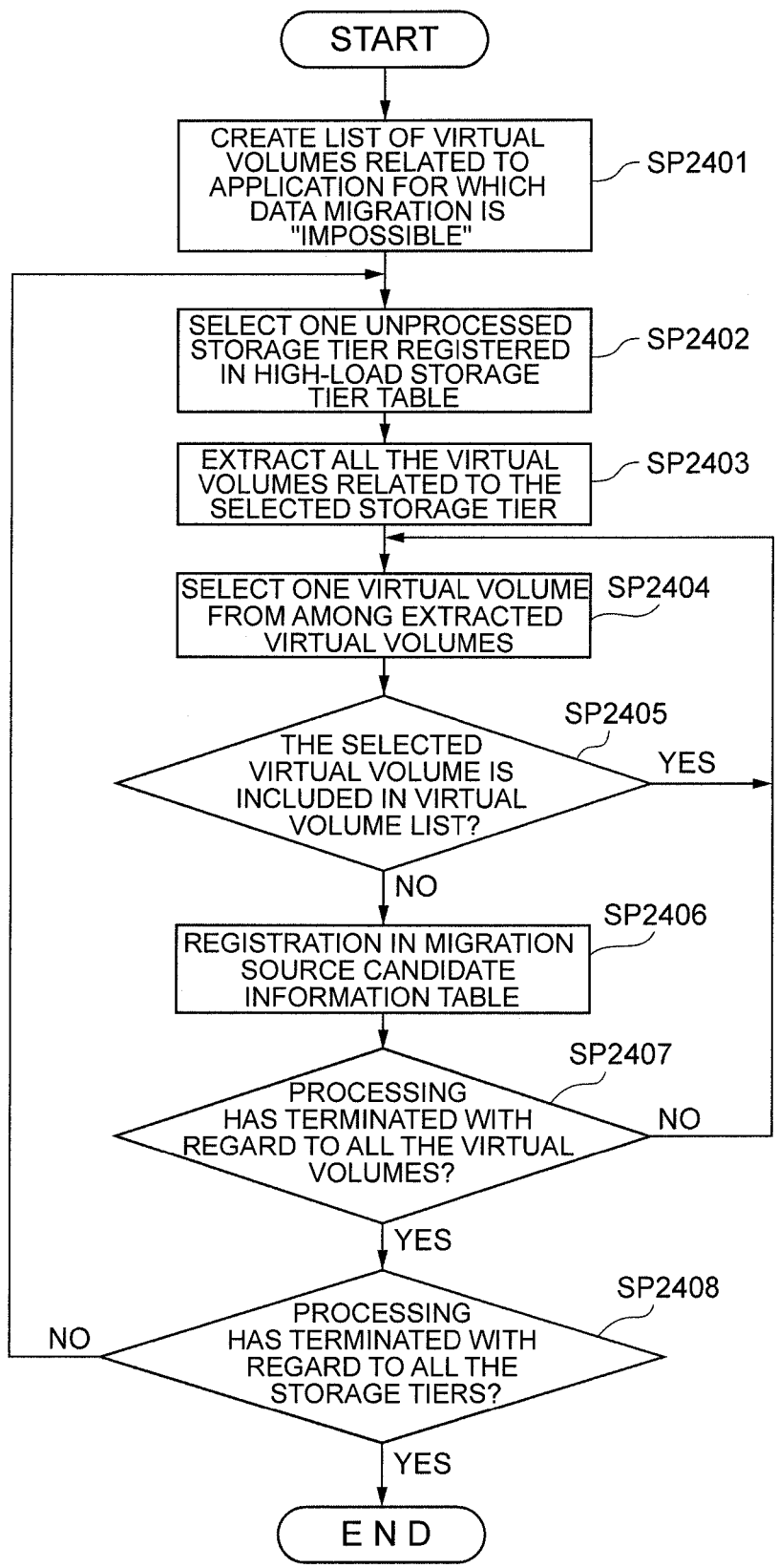
FIG. 24 is a flowchart illustrating a processing sequence of migration source candidate selection processing.

FIG. 24 shows a processing sequence for the migration source candidate selection processing executed by the migration source candidate selector 308 (FIG. 3) in step SP2105 of the system performance management processing (FIG. 21) described earlier.

The migration source candidate selector 308 is activated regularly, for example, according to the scheduling setting or by the high-load storage tier detector 304 which has terminated the high-load storage tier detection processing (FIG. 23) described earlier. After the migration source candidate selector 308 is activated, it starts the migration source candidate selection processing shown in FIG. 24 and firstly refers to the AP condition table 306 (FIG. 14) and thereby creates a list of virtual volumes 204 associated with the application(s) 201 (FIG. 3) for which "impossible" is set with regard to data migration (the virtual volumes 204 from or to which data of the application(s) 201 is read or written) (hereinafter referred to as the "virtual volume list") (SP2401).

Specifically speaking, the migration source candidate selector 308 extracts all the applications, for which "impossible" is set with regard to data migration, from the AP condition table 306 and extracts all the virtual volumes 204 associated with those application 201 from the AP/virtual volume correspondence table 317 (FIG. 20), thereby creating the virtual volume list.

Next, the migration source candidate selector 308 selects one storage tier 206 on which processing from step SP2403 to step SP2406 described below has not been executed, from among the storage tiers 206 registered in the high-load storage tier table 305 (SP2402) and then extracts all the virtual volumes 204, to which the selected storage tier 206 places pages, by referring to the virtual volume/page/pool/storage tier correspondence table 701 (FIG. 7) (SP2403).

Subsequently, the migration source candidate selector 308 selects one virtual volume 204, on which processing from step SP2405 to step SP2407 described below has not been executed, from among the virtual volumes 204 extracted in step SP2403 (SP2404), and then judges whether or not this virtual volume 204 in included in the virtual volume list created in step SP2401 (SP2405).

If an affirmative judgment is returned in this step, the migration source candidate selector 308 returns to step SP2404; and if a negative judgment is returned, the migration source candidate selector 308 registers the virtual volume 204 selected in step SP2404 and the storage tier 206 selected in step SP2402 in the migration source candidate information table 309 (SP2406).

Subsequently, the migration source candidate selector 308 judges whether or not the execution of the same processing has terminated with respect to all the virtual volumes 204 extracted in step SP2403 (SP2407). If a negative judgment is returned in this step, the migration source candidate selector 308 returns to step SP2404 and repeats the same processing.

When the migration source candidate selector 308 has eventually finished executing the processing from step SP2404 to step SP2406 with respect to all the virtual volumes 204 and an affirmative judgment is thereby returned in step SP2407, the migration source candidate selector 308 judges whether or not the execution of the same processing has terminated with respect to all the storage tiers 206 registered in the high-load storage tier table 305 (SP2408). If a negative judgment is returned in this step, the migration source candidate selector 308 returns to step SP2402 and then repeats the same processing.

When the migration source candidate selector 308 has eventually finished executing the processing from step SP2402 to step SP2407 with respect to all the storage tiers 206 registered in the high-load storage tier table 305 and an affirmative judgment is thereby returned in step SP2408, the migration source candidate selector 308 terminates this migration source candidate selection processing.

(6-6) Migration Destination Candidate Selection Processing

Figure 25:
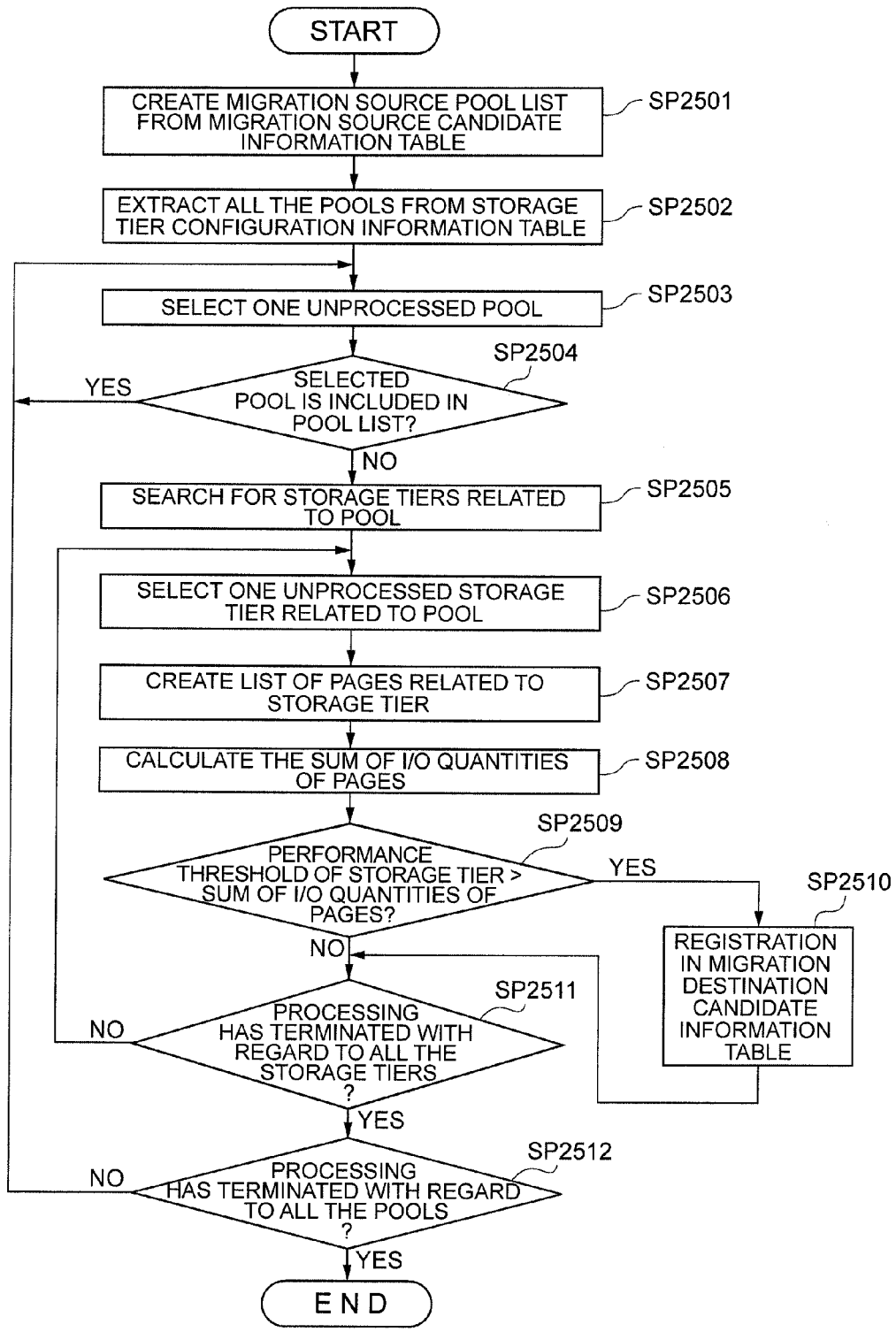
FIG. 25 is a flowchart illustrating a processing sequence of migration destination candidate selection processing.

FIG. 25 shows a processing sequence for the migration destination candidate selection processing executed by the migration destination candidate selector 310 (FIG. 3) in step SP2106 of the system performance management processing (FIG. 21) described earlier.

The migration destination candidate selector 310 is activated regularly, for example, according to the scheduling setting or by the migration source candidate selector 308 which has terminated the above-described migration source candidate selection processing (FIG. 24). After the migration destination candidate selector 310 is activated, it starts the migration destination candidate selection processing shown in FIG. 25 and firstly creates a list of pools 205 whose identifiers are stored in the pool identifier column 309B in the migration source candidate information table 309 (FIG. 15) (hereinafter referred to as the "pool list") (SP2501).

Next, the migration destination candidate selector 310 extracts all the pools 205 whose identifiers are stored in the pool identifier column 602 (FIG. 6) in the storage tier configuration information table 601 (FIG. 6) (SP2502), and selects one pool 205, on which processing from step SP2503 to step SP2512 has not been executed, from among those extracted pools 205 (SP2503).

Subsequently, the migration destination candidate selector 310 judges whether or not the pool 205 selected in step SP2503 is included in the pool list created in step SP2501 (SP2504). If an affirmative judgment is returned in this step, the migration destination candidate selector 310 returns to step SP2503.

On the other hand, if a negative judgment is returned in step SP2504, the migration destination candidate selector 310 searches the storage tier configuration information table 601 for the storage tiers 206 constituting the pool 205 selected in step SP2503 (SP2505).

The migration destination candidate selector 310 selects one storage tier 206, on which processing from step SP2507 to step SP2511 has not been executed, from among the storage tiers 206 detected by the search (SP2506).

The migration destination candidate selector 310 creates a list of pages placed by the storage tier 206 selected in step SP2506 (hereinafter referred to as the "page list") by referring to the virtual volume/page/pool/storage tier correspondence table 701 (FIG. 7) (SP2507), and calculates the sum of the average I/O quantities per unit time of the pages included in the page list by referring to the page performance information table 501 (FIG. 5) (SP2508).

Next, the migration destination candidate selector 310 refers to the storage tier configuration information table 601 and judges whether or not the sum of the average I/O quantities calculated in step SP2508 is less than the performance threshold of the relevant storage tier 206 (SP2509).

If an affirmative judgment is returned in this step, the migration destination candidate selector 310 registers the identifier of the pool 205 selected in step SP2503 in the migration destination candidate information table 311 (SP2510) and then proceeds to step SP2511.

On the other hand, if a negative judgment is returned in step SP2509, the migration destination candidate selector 310 judges whether or not the execution of the processing from step SP2507 to step SP2510 has terminated with respect to all the storage tiers 206 detected by the search in step SP2505 (SP2511). If a negative judgment is returned in this step, the migration destination candidate selector 310 returns to step SP2506 and then repeats the same processing.

When the migration destination candidate selector 310 has finished executing the processing from step SP2507 to step SP2510 with respect to all the storage tiers 206 detected by the search in step SP2505 and an affirmative judgment is thereby returned in step SP2511, the migration destination candidate selector 310 judges whether or not the execution of the processing from step SP2503 to step SP2511 has terminated with respect to all the pools 205 included in the pool list created in step SP2501 (SP2512). If a negative judgment is returned in this step, the migration destination candidate selector 310 returns to step SP2503 and then repeats the same processing.

When the migration destination candidate selector 310 has eventually finished executing the processing from step SP2503 to step SP2511 with respect to all the pools 205 included in the pool list created in step SP2501 and an affirmative judgment is thereby returned in step SP2512, the migration destination candidate selector 310 terminates this migration destination candidate selection processing.

(6-7) Migration Candidate Pair Deciding Processing

Figure 26:
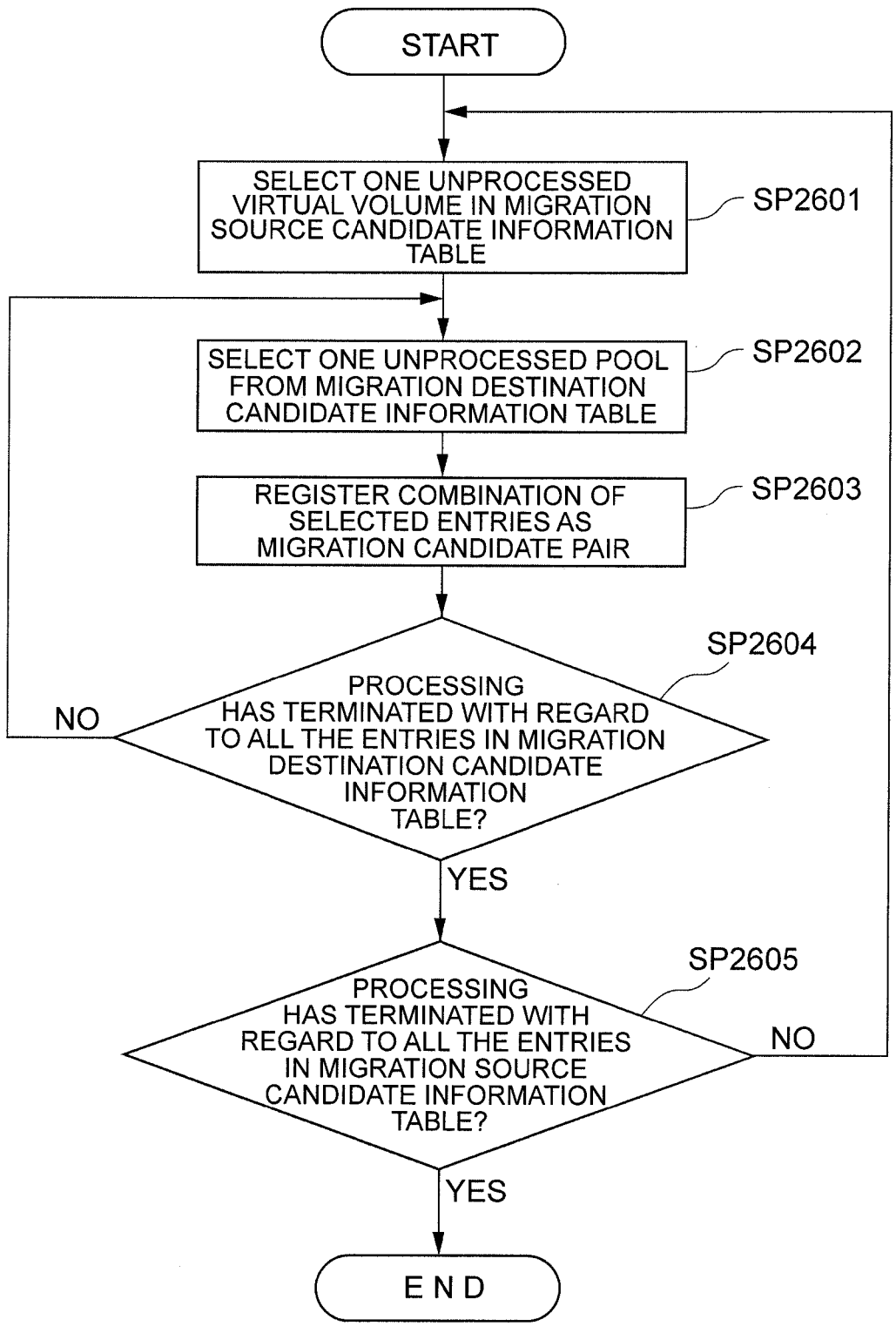
FIG. 26 is a flowchart illustrating a processing sequence of migration candidate pair deciding processing.

FIG. 26 shows a processing sequence for the migration candidate pair deciding processing executed by the migration candidate pair decision unit 312 in step SP2107 of the system performance management processing (FIG. 21) described earlier.

The migration candidate pair decision unit 312 is activated regularly, for example, according to the scheduling setting or by the migration destination candidate selector 310 which has terminated the above-described migration destination candidate selection processing (FIG. 25). After the migration candidate pair decision unit 312 is activated, it starts the migration candidate pair deciding processing shown in FIG. 26 and firstly selects one virtual volume, on which processing from step SP2602 to step SP2605 described below has not been executed, from among the migration-candidate virtual volumes 204 registered in the migration source candidate information table 309 (SP2601).

Next, the migration candidate pair decision unit 312 selects one migration destination pool 205, on which processing from step SP2603 to step SP2605 described below has not been executed, from among the migration destination pools 205 registered in the migration destination candidate information table 311 (SP2602).

The migration candidate pair decision unit 312 recognizes the migration-candidate virtual volume 204 selected in step SP2601 and the migration destination pool 205 selected in step SP2602 as a migration candidate pair, and stores the identifier of the migration-candidate virtual volume 204 selected in step SP2601, the identifier of the migration source pool 205 associated with that virtual volume 204 (or the migration source pool 205 which places pages to that virtual volume 204), and the identifier of the migration destination pool 205 selected in step SP2602 in the migration candidate pair table 313 (SP2603).

Next, the migration candidate pair decision unit 312 judges whether or not the execution of the processing step SP2603 has terminated with respect to all the migration destination pools 205 registered in the migration destination candidate information table 311 (SP2604).

If a negative judgment is returned in this step, the migration candidate pair decision unit 312 returns to step SP2602 and then repeats the same processing. As a result, a migration candidate pair which is a combination of the migration-candidate virtual volume 204 selected in step SP2601 and each migration destination pool 205 registered in the migration destination candidate information table 311 is formed sequentially and registered in the migration candidate pair table 313.

When the migration candidate pair decision unit 312 has eventually finished executing the processing from step SP2602 to step SP2604 with respect to all the migration destination pools 205 registered in the migration destination candidate information table 311 and an affirmative judgment is thereby returned in step SP2604, the migration candidate pair decision unit 312 judges whether or not the execution of the processing from step SP2602 to step SP2604 has terminated with respect to all the virtual volumes 204 registered in the migration source candidate information table 309 (SP2605).

If a negative judgment is returned in this step, the migration candidate pair decision unit 312 returns to step SP2601 and then repeats the same processing. As a result, the migration candidate pairs in all the combination patterns of the migration-candidate virtual volumes 204 registered in the migration source candidate information table 309 and the migration destination pools registered in the migration destination candidate information table 311 are formed and registered in the migration candidate pair table 313.

When the migration candidate pair decision unit 312 has eventually finished executing the processing from step SP2602 to step SP2604 with respect to all the virtual volumes 204 registered in the migration source candidate information table 309 and an affirmative judgment is thereby returned in step SP2605, the migration candidate pair decision unit 312 terminates this migration candidate pair deciding processing.

(6-8) Page Placement Deciding Processing

Figure 27:
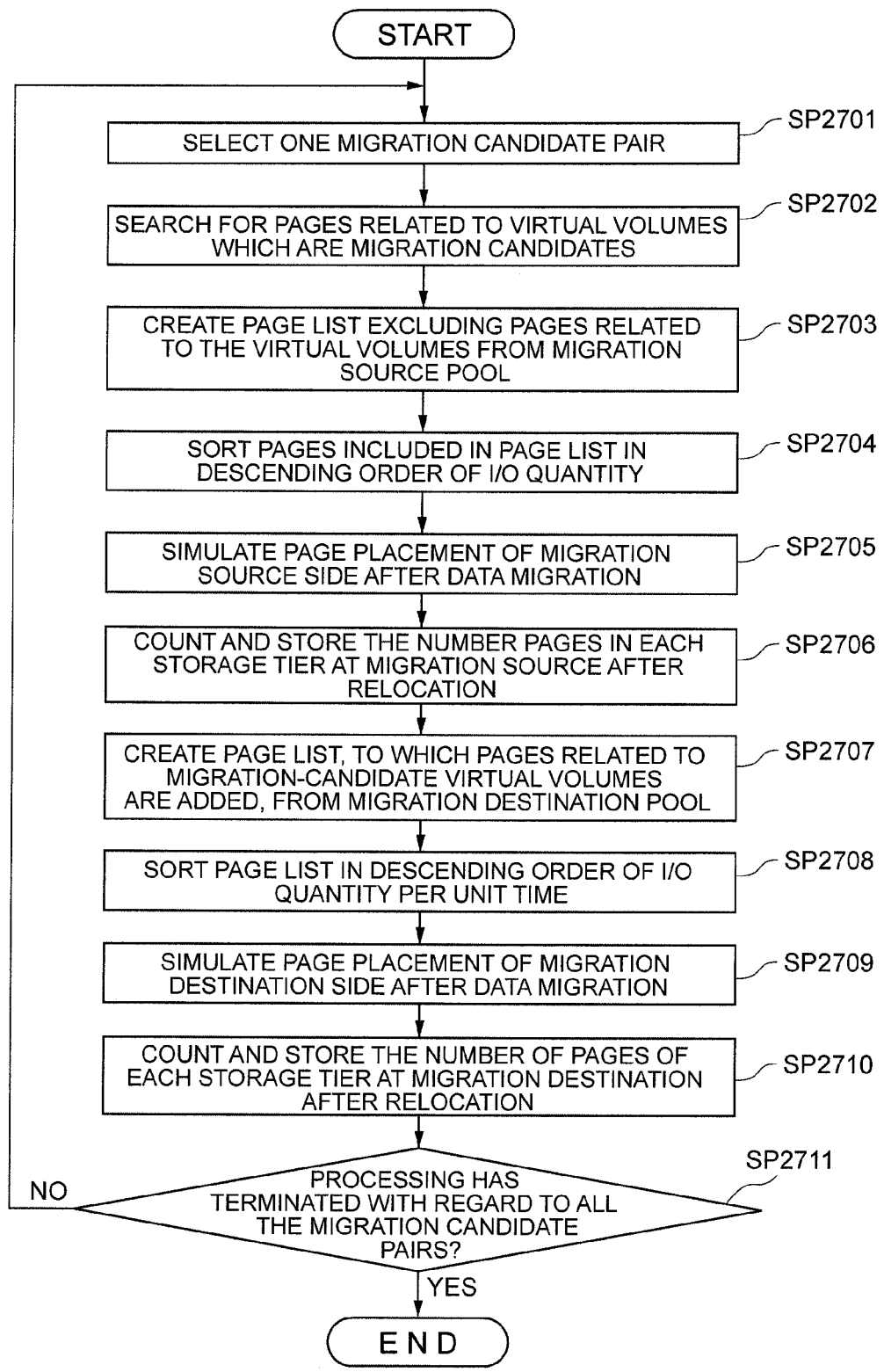
FIG. 27 is a flowchart illustrating a processing sequence of page placement deciding processing.

FIG. 27 shows a processing sequence for the page placement deciding processing executed by the page placement decision unit 315 (FIG. 3) in step SP2108 of the system performance management processing (FIG. 21) described earlier.

The page placement decision unit 315 is activated regularly, for example, according to the scheduling setting or by the migration candidate pair decision unit 312 which has terminated the above-described migration candidate pair deciding processing (FIG. 26). After the page placement decision unit 315 is activated, it starts the page placement processing shown in FIG. 27 and firstly selects one migration candidate pair, on which processing from step SP2702 to step SP2710 described below has not been executed, from the migration candidate pair table 313 (SP2701).

Next, the page placement decision unit 315 refers to the virtual volume/page/pool/storage tier correspondence table 701 (FIG. 7) and searches for all the pages placed from the migration source pool 205 of the migration candidate pair selected in step SP2701 to the migration-candidate virtual volume 204 (SP2702).

Subsequently, the page placement decision unit 315 refers to the virtual volume/page/pool/storage tier correspondence table 701 and creates a list of the remaining pages (hereinafter referred to as the "page list") excluding all the pages detected in step S2702 from among the pages currently placed by the migration source pool 205 of the migration candidate pair selected in step SP2701 to any of the virtual volumes 204 (SP2703).

Furthermore, the page placement decision unit 315 rearranges the pages included in the page list created in step SP2703 in descending order of the I/O quantity per unit time with respect to the pages (SP2704).

The page placement decision unit 315 then simulates the page placement of the migration source pool 205 after the data migration of the migration candidate pair selected in step SP2701 (SP2705).

Specifically speaking, the page placement decision unit 315 searches the virtual volume/page/pool/storage tier correspondence table 701 for all the storage tiers 206 constituting the migration source pool 205 and then places pages of a storage tier 206 with the highest performance, from among the storage tiers 206 detected by the above search, in descending order of priority starting from the highest priority (in descending order of the I/O quantity per unit time) from among the pages included in the page list.

When the page placement decision unit 315 finishes placing the pages of the storage tier 206 until the performance threshold or the capacity threshold of that storage tier 206 is reached, the page placement decision unit 315 places pages of a storage tier 206 with the second highest performance in descending order of priority starting from the highest priority (in descending order of the I/O quantity per unit time) from among the remaining pages included in the page list. Then, the page placement decision unit 315 repeats the same processing.

The above-described processing is equivalent to reallocation of pages of each storage tier 206 in descending order of performance, starting from the storage tier 206 with the highest performance, to each virtual page of each virtual volume 204 to which each page included in the page list has been placed. Therefore, by means of such processing, it is possible to simulate the page placement of the migration source pool 205 after executing the data migration processing on the migration candidate pair selected in step SP2701.

Next, the page placement decision unit 315 counts, for each storage tier 206, the number of pages placed to any of the virtual volumes 204 by each of the storage tiers 206 constituting the migration source pool 205 in the simulation in step SP2705 and stores the count values in the post-page placement information table 318 (FIG. 18) (SP2706).

Subsequently, the page placement decision unit 315 refers to the virtual volume/page/pool/storage tier correspondence table 701 and creates the page list by adding pages currently placed by the migration source pool 205 to the migration-candidate virtual volume 204, to the pages currently placed by the migration destination pool 205 of the migration candidate pair selected in step SP2701 to any of the virtual volumes 204 (SP2707).

Furthermore, the page placement decision unit 315 rearranges the pages included in the page list created in step SP2707 in descending order of the I/O quantity per unit time with respect to the pages (SP2708).

The page placement decision unit 315 then simulates, in the same manner as in step SP2705, the page placement of the migration destination pool 205 after data migration of the migration candidate pair selected in step SP2701 (SP2709).

Next, the page placement decision unit 315 counts, for each storage tier 206, the number of pages placed by each of the storage tiers 206 constituting the migration destination pool 205 to any of the virtual volumes 204 in the simulation in step SP2709 and stores the count values in the post-page placement information table 318 (SP2710).

Subsequently, the page placement decision unit 315 judges whether or not the execution of the processing from step SP2702 to step SP2720 has terminated with respect to all the migration candidate pairs registered in the migration candidate pair table 313 (SP2711). If a negative judgment is returned in this step, the page placement decision unit 315 returns to step SP2701 and then repeats the processing from step SP2701 to step SP2711.

When the page placement decision unit 315 has eventually finished executing the processing from step SP2702 to step SP2710 with respect to all the migration candidate pairs registered in the migration candidate pair table 313 and an affirmative judgment is thereby returned in step SP2711, the page placement decision unit 315 terminates this page placement deciding processing.

Figure 28A:
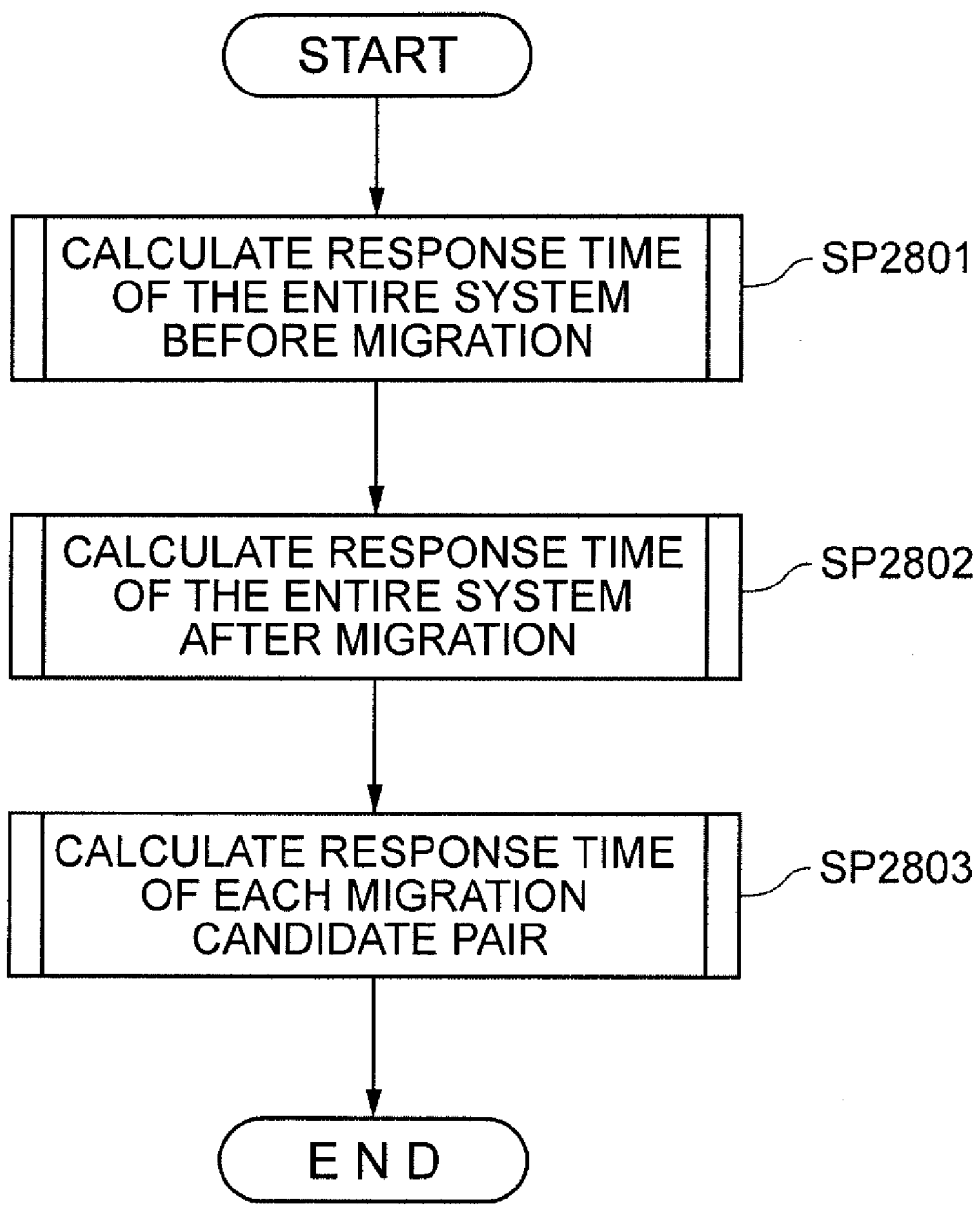
FIG. 28A is a flowchart illustrating a processing sequence of response performance calculation processing.

(6-9) Response Performance Calculation Processing (6-9-1) Response Performance Calculation Processing FIG. 28A shows a processing sequence for the response performance calculation processing executed by the response performance calculator 314 in step SP2109 in the system performance management processing (FIG. 21) described earlier.

The response performance calculator 314 is activated regularly, for example, according to the scheduling setting or by the page placement decision unit 315 which has terminated the page placement deciding processing (FIG. 27). After the response performance calculator 314 is activated, it starts the response performance calculation processing shown in FIG. 28A and firstly calculates response time of the current entire computer system 100 (before migrating data stored in the migration-candidate virtual volume 204) (SP2801).

Next, the response performance calculator 314 calculates response time of the entire computer system 100 after migrating data stored in the migration-candidate virtual volume 204 with respect to each migration candidate pair registered in the migration candidate pair table 313 (SP2802), and also calculate response time of the migration source pool 205 and the migration destination pool 205 before and after the data migration with respect to each migration candidate pair (SP2803). Then, the response performance calculator 314 terminates this response performance calculation processing.

(6-9-2) Pre-migration System Response Time Calculation Processing

Figure 28B:
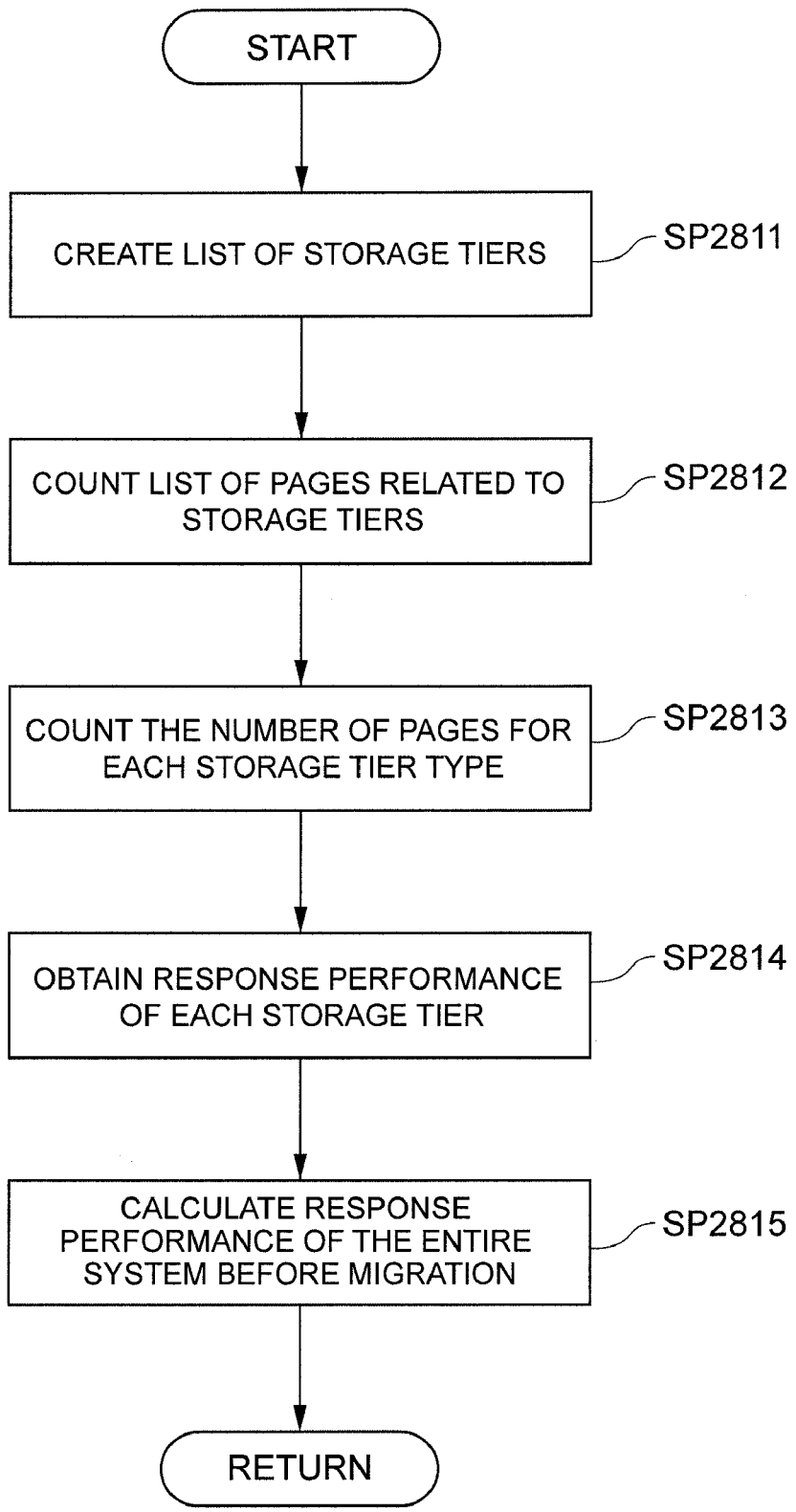
FIG. 28B is a flowchart illustrating a processing sequence of pre-migration system response time calculation processing.

FIG. 28B shows a processing sequence for the pre-migration system response time calculation processing executed by the response performance calculator 314 in step SP2801 of the above-described response performance calculation processing (FIG. 28A).

As the response performance calculator 314 proceeds to step SP2801 of the response performance calculation processing, it starts this pre-migration system response time calculation processing and firstly creates a storage tier list including all the storage tiers 206 defined in the storage apparatus 103 by referring to the storage tier configuration information table 601 (SP2810).

Next, the response performance calculator 314 creates a page list including all the pages placed by each storage tier 206 included in the storage tier list created in step SP2810 to any of the virtual volumes 204 by referring to the virtual volume/page/pool/storage tier correspondence table 701 (FIG. 7) (SP2811).

The response performance calculator 314 divides the pages included in the page list created in step SP2811 into groups, each of which corresponds to each storage tier type of the storage tiers 206 which have placed the pages; and then counts the number of pages for each group (SP2812). Furthermore, the response performance calculator 314 obtains response performance of each storage tier type from the storage tier response performance table 1201 (FIG. 12) (SP2813).

Next, the response performance calculator 314 calculates response performance $SRP_{before}$ before of the entire computer system 100 before migrating data of the migration-candidate virtual volume 204 to the migration destination pool 205 based on the number of pages for each storage tier type as counted in step SP2812 and the response performance of each storage device type as obtained in step SP2813 according to, for example, the following formula (SP2814):

[Formula 2]

$$SRP_{before} = \frac{\sum(\text{Number of pages for each storage tier type} \times \text{Response performance of each storage tier type})}{\sum \text{Number of pages allocated by storage tier}} \quad (2)$$

Then, the response performance calculator 314 terminates this pre-migration system response time calculation processing and returns to the response performance calculation processing (FIG. 28A).

(6-9-3) Post-migration System Response Time Calculation Processing

Meanwhile, FIG. 28C shows a processing sequence for the post-migration system response time calculation processing executed by the response performance calculator 314 in step SP2802 of the aforementioned response performance calculation processing (FIG. 28A).

As the response performance calculator 314 proceeds to step SP2802 of the response performance calculation processing, it starts this post-migration system response time calculation processing and firstly obtains response performance of each storage tier type from the storage tier response performance table 1201 (FIG. 12) (SP2821).

Next, the response performance calculator 314 selects one migration candidate pair (one row in the migration candidate pair table), on which processing from step SP2823 to step SP2837 has not been executed, from among the migration candidate pairs registered in the migration candidate pair table 313 (FIG. 3) (SP2822).

Subsequently, the response performance calculator 314 initializes a parameter for counting the total number of pages of the entire computer system 100 as described later (SP2823), and then initializes a parameter for counting the total number of pages for each storage tier type (SP2824).

The response performance calculator 314 obtains the identifier of the migration-candidate virtual volume 204, the identifier of the migration source pool 205, and the identifier of the migration destination pool 205 from the migration candidate pair table 313 with respect to the migration candidate pair selected in step SP2822 (SP2825).

Furthermore, the response performance calculator 314 creates a list of all the pools 205 defined in any of the storage apparatuses 103 (which excludes any redundancy and will be hereinafter referred to as the "pool list") based on the storage tier configuration information table 601 (SP2826).

Subsequently, the response performance calculator 314 selects one pool 205, on which processing from step SP2828 to step SP2830 has not been executed, from among the pools 205 included in the pool list (SP2827), and then judges whether or not the selected pool 205 is the migration source pool 205 or the migration destination pool 205 of the migration candidate pair selected in step SP2822 (SP2828). If an affirmative judgment is returned in this step, the response performance calculator 314 returns to step SP2827.

On the other hand, if a negative judgment is returned in step SP2828, the response performance calculator 314 obtains the total number of pages, which are placed by each of the storage tiers 206 constituting the pool 205 selected in step SP2827 to the virtual volumes 204, from the virtual volume/page/pool/storage tier correspondence table 701 and adds the obtained value to the total number of pages of the entire computer system 100 (SP2829). Moreover, the response performance calculator 314 refers to the storage tier configuration information table 601 and the virtual volume/page/pool/storage tier correspondence table 701, obtains the number of pages for each storage tier type of the storage tiers 206 constituting the pool 205, and adds the obtained value to the total number of pages for each storage tier type (SP2830).

Next, the response performance calculator 314 judges whether or not the execution of the processing from step SP2828 to step SP2830 has terminated with respect to all the pools 205 included in the pool list created in step SP2826 (SP2831). If a negative judgment is returned in this step, the response performance calculator 314 returns to step SP2827 and then repeats the same processing.

When the response performance calculator 314 has finished executing the processing from step SP2828 to step SP2830 with respect to all the pools 205 included in the pool list created in step SP2826 and an affirmative judgment is thereby returned in step SP2831, the response performance calculator 314 refers to the post-page placement information table 318 (FIG. 18), obtains the sum of pages placed to any of the virtual volumes 204 by each of the storage tiers 206 constituting the migration source pool 205 after migrating data of the migration-candidate virtual volume 204 of the migration candidate pair selected in step SP2822 to the migration destination pool 205, and then adds the obtained value to the total number of pages of the entire computer system 100 (SP2832).

Furthermore, the response performance calculator 314 refers to the storage tier configuration information table 601 (FIG. 6) and the post-page placement information table 318, obtains, for each storage tier type, the number of pages placed to any of the virtual volumes 204 by the storage tiers 206 constituting the migration source pool 205 after migrating data of the migration-candidate virtual volume 204 of the migration candidate pair selected in step SP2822 to the migration destination pool 205, and then adds the obtained number of pages for each storage tier type to the total number of pages for each storage tier (SP2833).

Next, the response performance calculator 314 refers to the post-page placement information table 318, obtains the total number of pages placed to any of the virtual volumes 204 by each of the storage tiers 206 constituting the migration destination pool 205 after migrating data of the migration-candidate virtual volume 204 of the migration candidate pair selected in step SP2822 to the migration destination pool 205, and then adds the obtained value to the total number of pages of the entire computer system 100 (SP2834).

Furthermore, the response performance calculator 314 refers to the storage tier configuration information table 601 and the post-page placement information table 318, obtains, for each storage tier type, the number of pages placed to any of the virtual volumes 204 by the storage tiers 206 constituting the migration destination pool 205 after migrating data of the migration-candidate virtual volume 204 of the migration candidate pair selected in step SP2822 to the migration destination pool 205, and then adds the obtained number of pages for each storage tier type to the total number of pages for each storage tier (SP2835).

Subsequently, the response performance calculator 314 calculates response performance $SRP_{after}$ of the entire computer system 100 after migrating data of the migration-candidate virtual volume 204 to the migration destination pool 205 based on the total number of pages of the entire computer system 100 counted as described above, the total number of pages for each storage tier type, and the storage tier response performance table 1201 according to, for example, the following formula (SP2836):

[Formula 3]

$$SRP_{after} = \frac{\sum(\text{Number of pages for each storage tier type} \times \text{Response performance of each storage tier type})}{\text{Total number of pages}} \quad (3)$$

Then, the response performance calculator 314 stores the calculated response performance $SRP_{after}$ after in the response performance table 320 (SP2837).

Next, the response performance calculator 314 judges whether or not the execution of the same processing has terminated with respect to all the migration candidate pairs registered in the migration candidate pair table 3313 (SP2838). If a negative judgment is returned in this step, the response performance calculator 314 returns to step SP2822 and then repeats the processing from step SP2822 to step SP2838.

When the response performance calculator 314 has eventually terminated executing the processing from step SP2823 to SP2837 with respect to all the migration candidate pairs registered in the migration candidate pair table 3313 and an affirmative judgment is thereby returned in step SP2838, the response performance calculator 314 terminates this post-migration system response time calculation processing and returns to the response performance calculation processing (FIG. 28A).

(6-9-4) Migration Candidate Pair Response Time Calculation Processing

Figure 28D:
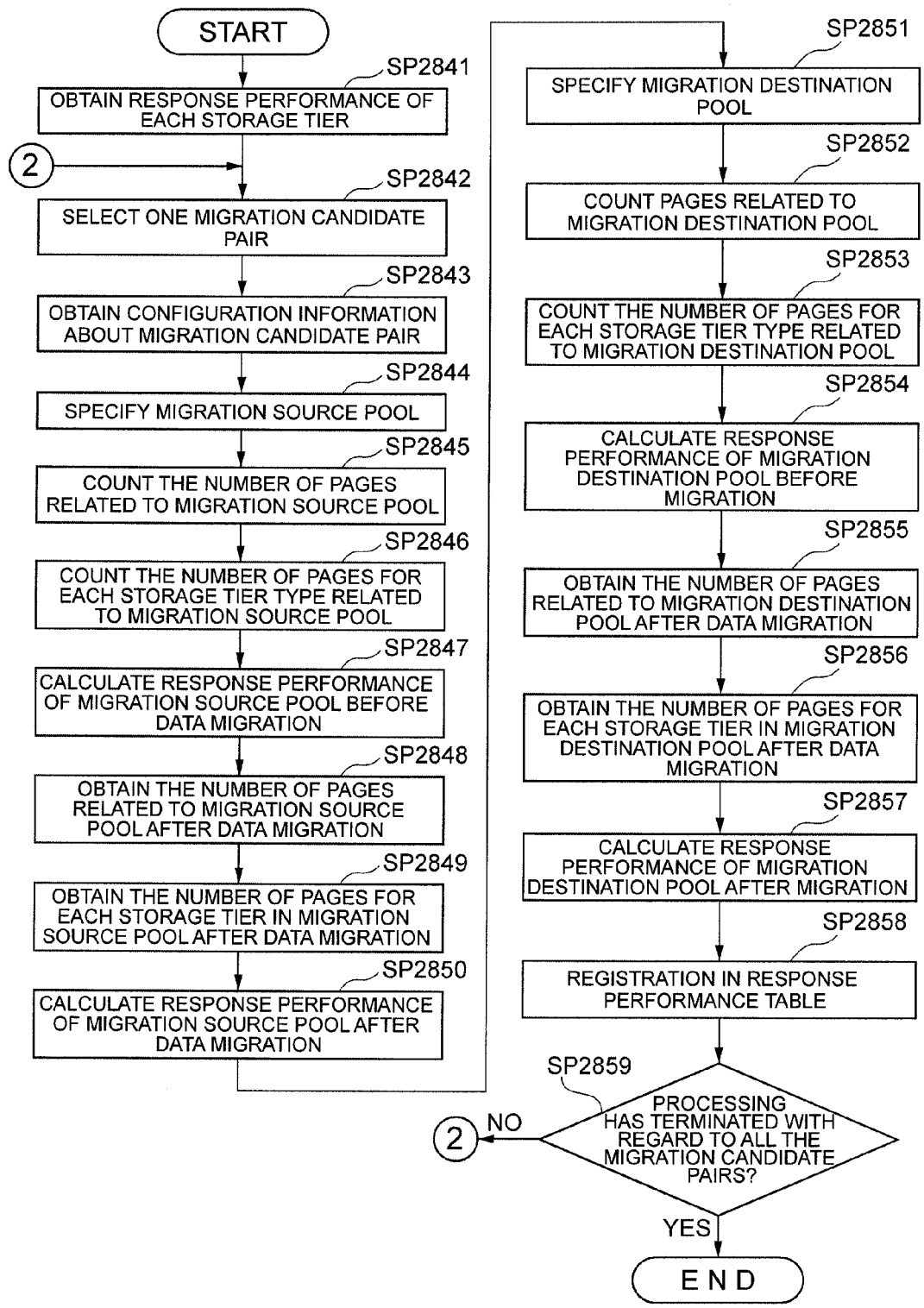
FIG. 28D is a flowchart illustrating a processing sequence of migration candidate pair response time calculation processing.

Meanwhile, FIG. 28D shows a processing sequence for the migration candidate pair response time calculation processing executed by the response performance calculator 314 in step SP2803 of the aforementioned response performance calculation processing (FIG. 28A).

As the response performance calculator 314 proceeds to step SP2803 of the response performance calculation processing, it starts this migration candidate pair response time calculation processing and firstly obtains response performance of each storage tier type from the storage tier response performance table 1201 (FIG. 12) (SP2841).

Next, the response performance calculator 314 selects one migration candidate pair (one row in the migration candidate pair table), on which processing from step SP2843 to step SP2858 described below has not been executed, from among the migration candidate pairs registered in the migration candidate pair table 313 (SP2842).

The response performance calculator 314 obtains, with respect to the migration candidate pair selected in step SP2842, the identifier of the migration-candidate virtual volume 204, the identifier of the migration source pool 205, and the identifier of the migration destination pool 205 from the migration candidate pair table 313 (SP2843), and specifies the migration source pool 205 of the migration candidate pair based on the obtained result (SP2844).

Next, the response performance calculator 314 counts the total number pages placed to any of the virtual volumes 204 by all the storage tiers 206 constituting the current migration source pool 205 respectively by referring to the virtual volume/page/pool/storage tier correspondence table 701 (SP2845), and also counts the total number of pages for each storage tier type with respect to the storage tiers 206 related to the current migration source pool 205 by referring to the storage tier configuration information table 601 (FIG. 6) and the virtual volume/page/pool/storage tier correspondence table 701 (FIG. 7) (SP2846).

Furthermore, the response performance calculator 314 calculates response performance $CRP_{s-before}$ of the migration source pool 205 before migrating data of the migration-candidate virtual volume 204 to the migration destination pool 205 based on the count results of step SP2845 and step SP2846 according to, for example, the following formula (SP2847):

[Formula 4]

$$CRP_{s-before} = \frac{\sum(\text{Number of pages for each storage tier type related to } \textit{migrationsource} \text{ pool} \times \text{Response performance of each storage tier type})}{\text{Total number of pages related to } \textit{migrationsource} \text{ pool}} \quad (4)$$

Next, the response performance calculator 314 obtains the total number of pages related to the migration source pool 205 after migrating data of the migration-candidate virtual volume 204 of the migration candidate pair selected in step SP2842 to the migration destination pool 205 from the post-page placement information table 318 (FIG. 18) (SP2848), and also obtains the total number of pages for each storage tier type of the storage tiers 206 related to the migration source pool 205 after the migration from the post-page placement information table 318 (SP2849).

Furthermore, the response performance calculator 314 calculates response performance $CRP_{s-after}$ of the migration source pool 205 after migrating data of the migration-candidate virtual volume 204 to the migration destination pool 205 based on the obtained results of step SP2848 and step SP2849 according to, for example, the following formula (SP2850):

[Formula 5]

$$CRP_{s-after} = \frac{\sum(A \times \text{Response performance of each storage tier type})}{\text{Total number of pages related to migration source pool after migration}} \quad (5)$$

(where "A" is the number of pages for each storage tier type related to migration source pool after migration).

Next, the response performance calculator 314 specifies the migration destination pool 205 of the migration candidate pair selected in step SP2842 based on the configuration information about the migration candidate pair obtained in step SP2843 (SP2851).

The response performance calculator 314 counts the total number of pages related to the current migration destination pool 205 by referring to the virtual volume/page/pool/storage tier correspondence table 701 (SP2852), and counts the total number of pages of each storage tier type of the storage tiers 206 related to the current migration destination pool 205 by referring to the storage tier configuration information table 601 and the virtual volume/page/pool/storage tier correspondence table 701 (SP2853).

Furthermore, the response performance calculator 314 calculates response performance $CRP_{t-before}$ of the migration destination pool 205 before migrating data of the migration-candidate virtual volume 204 to the migration destination pool 205 based on the count results of step SP2852 and step SP2853 according to, for example, the following formula (SP2854):

[Formula 6]

$$CRP_{t-before} = \frac{\sum (B \times \text{Response performance of each storage tier type})}{\text{Total number of pages related to migration destination pool}} \quad (6)$$

(where "B" is the number of pages for each storage tier type related to migration destination pool).

Next, the response performance calculator 314 obtains the total number of pages related to the migration destination pool 205 after migrating data of the migration-candidate virtual volume 204 of the migration candidate pair selected in step SP2842 from the post-page placement information table 318 (SP2855), and obtains the total number of pages for each storage tier type of the storage tiers 206 related to the migration destination pool 205 after the data migration from the post-page placement information table 318 (SP2856).

Furthermore, the response performance calculator 314 calculates response performance $CRP_{t-after}$ of the migration destination pool 205 after migrating data of the migration-candidate virtual volume 204 to the migration destination pool 205 based on the obtained results of step SP2855 and step SP2856 according to, for example, the following formula (SP2857):

[Formula 7]

$$CRP_{t-after} = \frac{\sum (C \times \text{Response performance of each storage tier type})}{\text{Total number of pages related to migration destination pool after migration}} \quad (7)$$

(where "C" is the number of pages for each storage tier type related to migration destination pool after migration).

Next, the response performance calculator 314 registers the response performance calculated in step SP2847, step SP2850, step SP2854 and step SP2857 in the response performance table 320 (SP2858).

Subsequently, the response performance calculator 314 judges whether or not the execution of the same processing has terminated with respect to all the migration candidate pairs registered in the migration candidate pair table 313 (SP2859). If a negative judgment is returned in this step, the response performance calculator 314 returns to step SP2842 and then repeats the same processing.

When the response performance calculator 314 has eventually finished executing the processing from step SP2843 to step SP2858 with respect to all the migration candidate pairs registered in the migration candidate pair table 313 and an affirmative judgment is thereby returned in step SP2859, the response performance calculator 314 terminates this migration candidate pair response time calculation processing.

(6-10) Migration Object Deciding Processing

Figure 29:
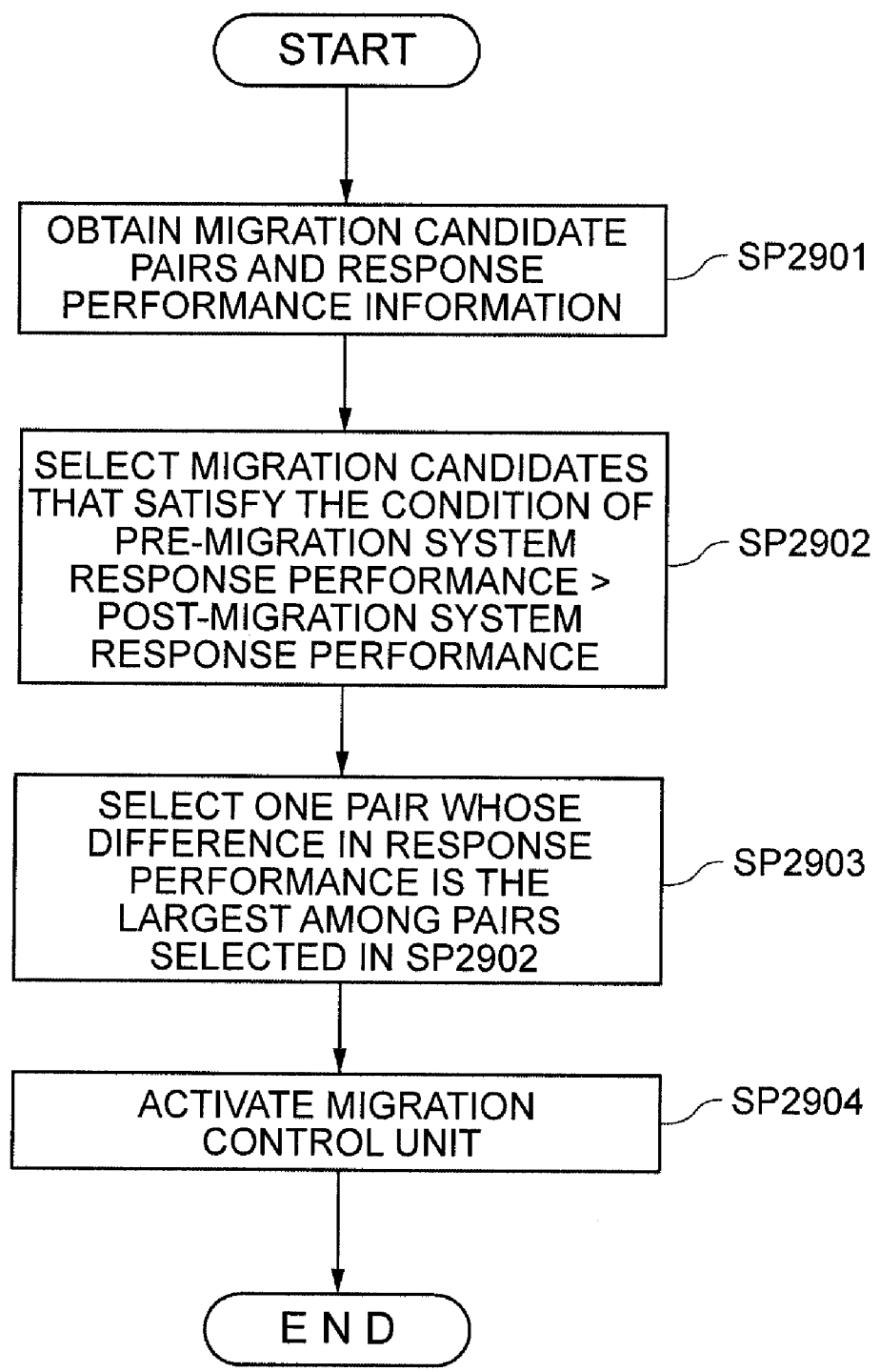
FIG. 29 is a flowchart illustrating a processing sequence of migration object deciding processing.

FIG. 29 shows a processing sequence for the migration object deciding processing executed by the migration object decision unit 319 (FIG. 3) in step SP2110 of the system performance management processing (FIG. 21) described earlier.

The migration object decision unit 319 is activated regularly, for example, according to the scheduling setting. After the migration object decision unit 319 is activated, it starts the migration object deciding processing shown in FIG. 29 and firstly obtains, from the migration candidate pair table 313, the configuration information about the migration candidate pairs registered in the migration candidate pair table 313 and also obtains the response performance of each migration candidate pair from the response performance table 320 (SP2901).

Next, the migration object decision unit 319 selects all the migration candidate pairs regarding which the response performance of the entire computer system 100 after migrating data of the migration-candidate virtual volume 204 is lower than that before the data migration (SP2902).

Subsequently, the migration object decision unit 319 selects a migration candidate pair regarding which the difference between the response performance before migrating data of the migration-candidate virtual volume 204 and the response performance after the data migration is the largest, from among the migration candidate pairs selected in step SP2902 (SP2903).

Furthermore, the migration object decision unit 319 issues a migration execution request to the migration control unit 322 (FIG. 3), demanding that the data stored in the migration-candidate virtual volume 204 constituting the then selected migration candidate pair should be migrated to the migration destination pool 205 constituting that migration candidate pair, thereby activating the migration control unit 322 (SP2904). Then, the migration object decision unit 319 terminates this migration object deciding processing.

(6-11) Migration Information Display Processing

Figure 30:
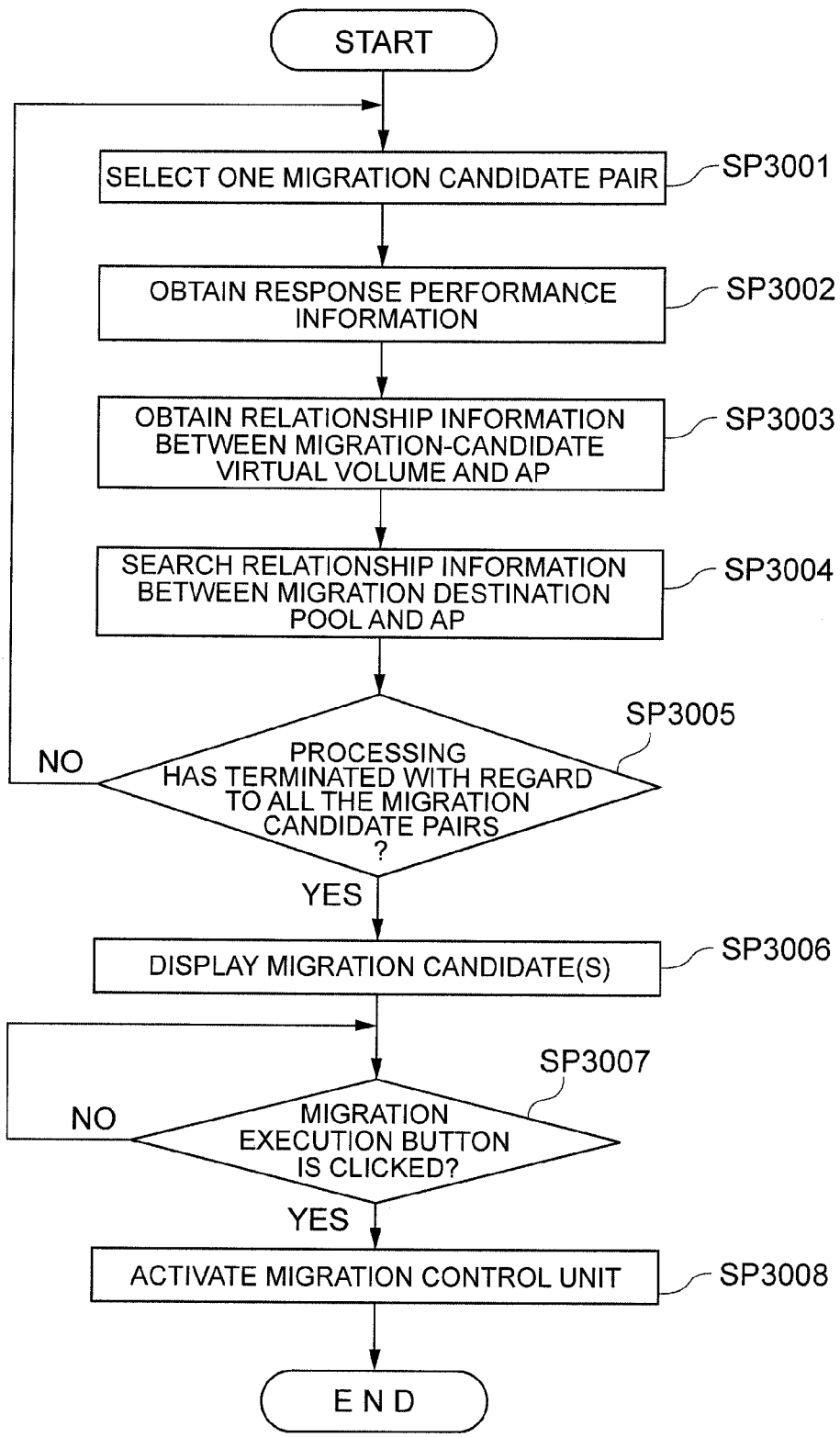
FIG. 30 is a flowchart illustrating a processing sequence of migration information display processing.

FIG. 30 shows a processing sequence for the migration information display processing executed by the migration information display unit 321 in step SP2111 of the system performance management processing (FIG. 21) described earlier.

For example, after the user operates the storage management client 105 in the computer system 100 and inputs an instruction to display the migration information display screen 401 described earlier with reference to FIG. 4, a screen display request according to this instruction is issued from the storage management client 105 to the performance monitoring server 107.

After receiving this screen display request, the migration information display unit 321 starts the migration information display processing shown in FIG. 30 and firstly selects one migration candidate pair from among migration candidate pairs registered in the migration candidate pair table 313 (SP3001) and obtains information about the response performance of the selected migration candidate pair from the response performance table 320 (SP3002).

Incidentally, the phrase "information about the response performance of the migration candidate pair" means information stored in each of the pre-migration system response performance column 320B (FIG. 19), the post-migration system response performance column 320C (FIG. 19), the pre-migration migration source pool response performance column 320D (FIG. 19), the post-migration migration source pool response performance column 320E (FIG. 19), the pre-migration migration destination pool response performance column 320F (FIG. 19) and the post-migration migration destination pool response performance column 320G (FIG. 19) in the corresponding row in the response performance table 320.

Subsequently, the migration information display unit 321 searches the AP/virtual volume correspondence table 317 (FIG. 20) for the application 201 (see FIG. 2) associated with the migration-candidate virtual volume 204 constituting the migration candidate pair selected in step SP3001 (SP3003).

The migration information display unit 321 judges whether or not the execution of the same processing has terminated with respect to all the migration candidate pairs registered in the migration candidate pair table 313 (SP3005). If a negative judgment is returned in this step, the migration information display unit 321 returns to step SP3001 and then repeats the processing from step SP3001 to step SP3005.

When the migration information display unit 321 has eventually finished executing the processing from step SP3002 to step SP3004 with respect to all the migration candidate pairs registered in the migration candidate pair table 313 and an affirmative judgment is thereby returned in step SP3005, the migration information display unit 321 sends the various information collected as described above to the storage management client 105. As a result, the above-described migration information display screen 401 (FIG. 4) on which the various information about each migration candidate pair registered in the migration candidate pair table 313 is indicated is displayed on the storage management client 105 (SP3006).

Subsequently, the migration information display unit 321 waits for the user to select a desired migration candidate pair as a data migration execution object by using the migration information display screen 401 displayed on the storage management client 105 and waits for the migration execution button 403 (FIG. 4) to be clicked (SP3007).

When the migration information display unit 321 is notified by the storage management client 105 that the operation of clicking the migration execution button 403 has been performed, the migration information display unit 321 issues a migration execution request, demanding that the data stored in the migration-candidate virtual volume 204 constituting the selected migration candidate pair should be migrated to the migration destination pool 205 constituting the migration candidate pair; and thereby activates the migration control unit 322 (SP3008). Then, the migration information display unit 321 terminates this migration information display processing.

(7) Advantageous Effects of This Embodiment

This computer system 100 can perform migration to maximize an improvement rate of response performance before and after migration of data written to a migration-candidate virtual volume 204, based on the number of accesses per unit time for each page allocated from each storage tier 206 to each virtual volume 204 and a capacity usage rate of each storage tier 206 as described above. Accordingly, cases where storage areas in high-performance storage devices 142 are not fully used due to a large number of accesses per unit time can be detected and such situation can be solved. Therefore, it is possible to enhance the response performance of the entire system.

Furthermore, with this computer system 100, virtual volumes 204 used by an application(s) 201 prohibited from migration of data used is prohibited are not selected as migration candidates, and it is possible to have the storage management client 105 display, on the migration information display screen 401, information such as an identifier(s) of an application(s) using virtual volumes 204 which are migration candidates. Therefore, it is possible to assist a judgment on the migration in consideration of the influence of the applications 201.

(8) Other Embodiments

The above embodiment has described the case where the present invention is used for the performance monitoring server 107 for managing the storage apparatus(es) in the computer system 100 configured as shown in FIG. 1. However, this invention is not limited to the above-described embodiment and can be used for a wide variety of management apparatuses for managing storage apparatuses in other computer systems.

Also, the above embodiment has described the case where, for example, the configuration of each migration candidate pair and, in a case of data migration executed for each migration candidate pair, the response performance of the entire computer system 100, the migration source pool 205, and the migration destination pool 205 before and after the data migration are displayed on the migration information display screen 401. However, this invention is not limited to this embodiment and, for example, a storage tier(s) 206 whose I/O quantity per unit time has reached the performance threshold and whose actual capacity usage rate has not reached the capacity threshold may also be displayed as migration information on the migration information display screen 401. In addition, all or part of the performance threshold, I/O quantity per unit time, capacity threshold, and actual capacity usage rate of each storage tier 206 may also be displayed as the migration information on the migration information display screen 401.

The present invention can be applied to a wide variety of forms of management apparatuses for managing the performance of storage apparatuses which use the hierarchical pool configuration technique.

What is claimed is:

1. A management method for managing a storage apparatus,
wherein the storage apparatus manages, as different types of storage tiers, each of storage areas provided by multiple types of storage devices with different levels of performance, constitutes a pool from the different types of storage tiers, provides a virtual volume to a host system, dynamically allocates a storage area of specified size on a page basis from the pool to the virtual volume in response to a write request from the host system to the virtual volume, and regularly or irregularly switches a storage tier, from which a page is allocated, to another type of storage tier, depending on the number of accesses per unit time to the page allocated to the virtual volume, and
wherein the management method comprises:
a first step of detecting, as a high-load storage tier, a storage tier whose number of accesses per unit time has reached a performance threshold and whose used capacity has not reached a capacity threshold;
a second step of detecting a virtual volume to which a page is allocated from a pool constituted from the high-load storage tier, selecting a virtual volume that is a migration candidate whose data is to be migrated, from among the detected virtual volume, and selecting, as a migration source pool, a pool from which a page is allocated to the virtual volume;
a third step of selecting, as a migration destination pool, a pool whose at least one constituting storage tier has the number of accesses per unit time not reaching the performance threshold, and which is different from the migration source pool;
a fourth step of deciding a migration candidate pair by combining the selected migration-candidate virtual volume and the selected migration destination pool;
a fifth step of calculating, for each the migration candidate pair, response performance of an entire system before and after migration when data written to the migration-candidate virtual volume is to be migrated to the migration destination pool;
a sixth step of deciding a migration candidate pair which is a migration object, based on the response performance of the entire system before and after the migration; and
a seventh step of controlling the storage apparatus so that data of the migration-candidate virtual volume constituting the decided migration candidate pair will be migrated to the migration destination pool constituting the migration candidate pair.

2. The management method according to claim 1, wherein possibility of migration of data used by an application mounted in the host system is managed with regard to each application, and
wherein in the second step, the migration-candidate virtual volume is selected from among virtual volumes, excluding a virtual volume from or to which an application prohibited from migration of data used reads or writes the data.

3. The management method according to claim 1, wherein in the sixth step, a migration candidate pair concerning which the response performance of the entire system after the migration is lower than the response performance of the entire system before the migration and the difference between the response performance of the entire system before the migration and the response performance of the entire system after the migration is the largest is decided as the migration object.

4. The management method according to claim 1, wherein if a manual mode is set as an operation mode for the data migration from the migration object virtual volume to the migration destination pool,
in the sixth step, specified pieces of migration information including identifiers of the migration-candidate virtual volume, the migration source pool, and the migration destination pool, and the response performance of the entire system before and after migrating data of the migration-candidate virtual volume are displayed for each migration candidate pair, and
in the seventh step, the storage apparatus is controlled so that data of the migration-candidate virtual volume constituting the migration candidate pair designated by a user from among the migration candidate pair for which the migration information is displayed will be migrated to the migration destination pool constituting the migration candidate pair.

5. The management method according to claim 4, wherein in the sixth step, at least one of response performance of the migration source pool and the migration destination pool before and after the migration, and an identifier of an application using the migration-candidate virtual volume is also displayed as the migration information.

6. The management method according to claim 4, wherein in the sixth step, the storage tier whose number of accesses per unit time has reached the performance threshold and whose used capacity has not reached the capacity threshold is also displayed as the migration information.

7. The management method according to claim 4, wherein in the sixth step, all or part of the performance threshold, the number of accesses per unit time, the capacity threshold, and a usage rate of the relevant storage tier is also displayed as the migration information.

8. A management apparatus for managing a storage apparatus,
wherein the storage apparatus manages, as different types of storage tiers, each of storage areas provided by multiple types of storage devices with different levels of performance, constitutes a pool from the different types of storage tiers, provides a virtual volume to a host system, dynamically allocates a storage area of specified size on a page basis from the pool to the virtual volume in response to a write request from the host system to the virtual volume, and regularly or irregularly switches a storage tier, from which a page is allocated, to another type of storage tier, depending on the number of accesses per unit time to the page allocated to the virtual volume, and
wherein the management apparatus comprises:
a high-load storage tier detector for detecting, as a high-load storage tier, a storage tier whose number of accesses per unit time has reached a performance threshold and whose used capacity has not reached a capacity threshold;
a migration source candidate selector for detecting a virtual volume to which a page is allocated from a pool constituted from the high-load storage tier, selecting a virtual volume that is a migration candidate whose data is to be migrated, from among the detected virtual volume, and selecting, as a migration source pool, a pool from which a page is allocated to the virtual volumes;
a migration destination candidate selector for selecting, as a migration destination pool, a pool whose at least one constituting storage tier has the number of accesses per unit time not reaching the performance threshold, and which is different from the migration source pool;
a migration candidate pair decision unit for deciding a migration candidate pair by combining the selected migration-candidate virtual volume and the selected migration destination pool;
a response performance calculator for calculating, for each migration candidate pair, response performance of an entire system before and after migration when data written to the migration-candidate virtual volume is to be migrated to the migration destination pool;
a migration object decision unit for deciding a migration candidate pair which is a migration object, based on the response performance of the entire system before and after the migration; and
a migration control unit for controlling the storage apparatus so that data of the migration-candidate virtual volume constituting the decided migration candidate pair will be migrated to the migration destination pool constituting the migration candidate pair.

9. The management apparatus according to claim 8, wherein the migration source candidate selector manages, with respect to each application mounted in the host system, the possibility of migration of data used by the application; and selects the migration-candidate virtual volume from among virtual volumes, excluding a virtual volume from or to which an application prohibited from migration of data used reads or writes the data.

10. The management apparatus according to claim 8, wherein the migration object decision unit decides, as the migration object, a migration candidate pair concerning which the response performance of the entire system after the migration is lower than the response performance of the entire system before the migration and the difference between the response performance of the entire system before the migration and the response performance of the entire system after the migration is the largest.

11. The management apparatus according to claim 8, further comprising a migration information display unit that, if a manual mode is set as an operation mode for the data migration from the migration object virtual volume to the migration destination pool, displays specified pieces of migration information for each migration candidate pair including identifiers of the migration-candidate virtual volume, the migration source pool, and the migration destination pool, and the response performance of the entire system before and after migrating data of the migration-candidate virtual volume, wherein the migration control unit controls the storage apparatus based on notification from the migration information display unit so that data of the migration-candidate virtual volume constituting the migration candidate pair designated by a user from among the migration candidate pair for which the migration information is displayed will be migrated to the migration destination pool constituting the migration candidate pair.

12. The management apparatus according to claim 11, wherein the migration information display unit also displays, as the migration information, at least one of response performance of the migration source pool and the migration destination pool before and after the migration, and an identifier of an application using the migration-candidate virtual volume.

13. The management apparatus according to claim 11, wherein the migration information display unit also displays, as the migration information, the storage tier whose number of accesses per unit time has reached the performance threshold and whose used capacity has not reached the capacity threshold.

14. The management apparatus according to claim 11, wherein the migration information display unit also displays, as the migration information, all or part of the performance threshold, the number of accesses per unit time, the capacity threshold, and a usage rate of the relevant storage tier.

* * * * *